US012596578B1

(12) United States Patent
Duan et al.

(10) Patent No.: US 12,596,578 B1
(45) Date of Patent: Apr. 7, 2026

(54) AUTOMATED INTERMEDIARY SYSTEM WITH REQUEST DATABASE AND RESOURCE POOL

(71) Applicant: DURATION LABS INC., Fort Lauderdale, FL (US)

(72) Inventors: Mingfang Duan, Miami, FL (US); Siyu Zhang, Boston, MA (US); Guan-yu Xu, Miami, FL (US)

(73) Assignee: DURATION LABS INC., Fort Lauderdale, FL (US)

( * ) Notice: Subject to any disclaimer, the term of this patent is extended or adjusted under 35 U.S.C. 154(b) by 0 days.

(21) Appl. No.: 19/196,651

(22) Filed: May 1, 2025

Related U.S. Application Data

(60) Provisional application No. 63/668,435, filed on Jul. 8, 2024, provisional application No. 63/738,070, filed
(Continued)

(51) Int. Cl.
*G06F 9/50* (2006.01)

(52) U.S. Cl.
CPC ................................. *G06F 9/5027* (2013.01)

(58) Field of Classification Search
CPC .................................................... G06F 9/5027
See application file for complete search history.

(56) References Cited

U.S. PATENT DOCUMENTS 6,725,456 B1    4/2004   Bruno et al.
7,627,510 B2   12/2009   Jain et al.
(Continued)

FOREIGN PATENT DOCUMENTS

WO    WO 2021/218743 A1   11/2021

OTHER PUBLICATIONS

Adams, A. et al., "A Primer on Uniswap v3 Math Part 2: Stay Awake by Reading it Aloud", Uniswap Labs, (Jun. 26, 2023), 13 pages.
(Continued)

*Primary Examiner* — Sisley N Kim
(74) *Attorney, Agent, or Firm* — FINNEGAN, HENDERSON, FARABOW, GARRETT & DUNNER LLP

(57) ABSTRACT

An automated intermediary system can include a request database and a resource pool including a first resource and a second resource. The resources can include, but are not limited to, cloud computing resources, communication network resources, or virtual machine types. The resource pool can include a tick structure including a sequence of ticks. Different quantities of resources can be associated with each tick. In response to a user request specifying an exchange of the first resource for the second resource, the automated intermediary system can attempt to match the user request to the request database. If the attempt is unsuccessful, automated intermediary system can attempt to match the user request to the resource pool. The automated intermediary system can update a user profile based on the results of the matching attempts. A user can withdraw resources from the automated intermediary system, causing the automated intermediary system to provide suitable instructions to third-party systems managing, controlling access to, or otherwise holding the resources.

18 Claims, 7 Drawing Sheets

100

Related U.S. Application Data on Dec. 23, 2024, provisional application No. 63/725, 214, filed on Nov. 26, 2024, provisional application No. 63/746,874, filed on Jan. 17, 2025.

(56) References Cited

U.S. PATENT DOCUMENTS

| | | | | |
|---|---|---|---|---|
| 10,812,613 B2 * | 10/2020 | Soni | | H04L 67/568 |
| 11,107,049 B2 | 8/2021 | Hertzog et al. | | |
| 11,816,732 B1 * | 11/2023 | Melachrinos | | G06Q 20/389 |
| 2016/0043970 A1 * | 2/2016 | Jacob | | G06F 9/5027 |
| | | | | 709/226 |
| 2018/0203630 A1 | 7/2018 | Waldspurger | | |
| 2021/0042833 A1 | 2/2021 | Alderucci et al. | | |
| 2021/0224728 A1 | 7/2021 | Nabicht et al. | | |
| 2022/0019482 A1 * | 1/2022 | Jiang | | G06N 20/00 |
| 2022/0084111 A1 | 3/2022 | Ladzik et al. | | |
| 2023/0281715 A1 * | 9/2023 | Bauerschmidt | | G06Q 40/00 |
| | | | | 705/37 |
| 2023/0336557 A1 * | 10/2023 | Frato | | H04L 63/108 |
| 2025/0007839 A1 | 1/2025 | Vaccaro et al. | | |

OTHER PUBLICATIONS

Ali, Z. et al., "A Comprehensive Utility Function for Resource Allocation in Mobile Edge Computing", Computers, Materials & Continua, Tech Science Press, Sep. 14, 2020, 17 pages.

Bitterli, T., et al., "Decentralized Exchanges: The Profitability Frontier of Constant Product Market Makers", IEEE CryptoEx, (2023), 7 pages.

Boogerwooger, S., "Uniswap V3 ticks—dive into concentrated liquidity", MixBytes, Accessed from the Internet on Aug. 1, 2025, 10 pages.

Bouchaud, J.P., et al., "Statistical Properties of Stock Order Books: Empirical Results and Models", Jun. 18, 2002, 12 pages.

Chen, J. et al., "An Universal Flexible Utility Function in Grid Economy", 2008 IEEE Pacific-Asia Workshop on Computational Intelligence and Industrial Application, IEEE Computer Society, (2008), 4 pages.

Chaudet, C., et al., "A Distributed Algorithm for Bandwidth Allocation in Stable Ad Hoc Networks." Wireless Ad-Hoc Networks, (2004), 15 pages.

Floyd, S. et al., "Random Early Detection Gateways for Congestion Avoidance," IEEE/ACM Transactions on Networking, vol. 1, No. 4, (Aug. 1993), 17 pages.

Fritsch, R. et al., "The Economics of Automated Market Makers", ETH Zurich, Germany, Jun. 9, 2022, 15 pages.

Guo, I., "Macroscopic Market Making Games", Centre For Quantitative Finance and Investment Strategies, School of Mathematics, Monash University, Jun. 9, 2024, 52 pages.

Hafner, M. et al., "Impermanent Loss Conditions: An Analysis of Decentralized Exchange Platforms", University of Zurich, Center for Cryptoeconomics and Swiss Economics, UZH Blockchain Center, (Feb. 9, 2024), 15 pages.

Hanson, R., "Combinatorial Information Market Design", Information Systems Frontiers, Kluwer Academic Publishers, vol. 5, No. 1, (2003), pp. 197-119.

Harris, L., "Trading and Exchanges: Market Microstructure for Practitioners", Fred V. Keenan Chair in Finance, Marshall School of Business, University of Southern California, Oxford University Press, Mar. 5, 2002, 113 pages.

Introducing Uniswap V3, URL: https://blog.uniswap.org/uniswap-v3, written by Uniswap Labs, (Mar. 23, 2021), 16 pages.

Maglaras, C. et al., "Optimal execution in a limit order book and an associated microstructure market impact model*", (2014).

Menkveld, A. J., "High Frequency Trading and the New-Market Makers1", (2013), 49 pages.

Mukherjee, A., "Development of Steady-State and Dynamic Mass and Energy Constrained Neural Networks for Distributed Chemical Systems Using Noisy Transient Data", Industrial and Engineering Chemistry Research, vol. 63, (2024), pp. 14211-14239.

Liu, Z. et al., "Discovering New Interpretable Conservation Laws as Sparse Invariants", Massachusetts Institute of Technology, Cambridge, MA, Jul. 4, 2023, 15 pages.

Othmer, "A Graph-Theoretic Analysis of Chemical Reaction Networks: Invariants, Network Equivalence and Nonexistence of Various Types of Steady States", Department of Mathematics, University of Utah, Salt Lake City, Utah 84112, (1981), 36 pages.

Othman, A., et al., "Automated Market-Making in the Large: The Gates Hillman Prediction Market.", EC'10, Jun. 7-11, 2010, Cambridge, MA, 10 pages.

PortSwigger, "Burp Intruder Resource Pools", Professional and Community Edition, Accessed from the Internet on Aug. 1, 2025, 2 pages.

Robinson, D. et al., "YieldSpace: An Automated Liquidity Provider for Fixed Yield Tokens", (2020), 23 pages.

Raghavan et al., "Cloud Control with Distributed Rate Limiting", Department of Computer Science and Engineering, University of California, San Diego, CA, SIGCOMM'07, Aug. 27-31, 2007, 12 pages.

Roth, A. E et al., What Have We Learned from Market Design? Economic Journal, vol. 118, No. 527, (Feb. 2009), pp. 285-310.

Slotine, J. J. E. et al., "Applied Nonlinear Control" (1991), 476 pages.

Waldspurger, C. A. et al., "Stride Scheduling: Deterministic Proportional-Share Resource Management," (Technical Memorandum MIT/LCS/TM 528). MIT Laboratory for Computer Science, Cambridge, MA, (Jun. 12, 1995), 23 pages.

Waldspurger, C.A. et al., "Lottery Scheduling: Flexible Proportional Share Resource Management," MIT Laboratory for Computer Science, Cambridge, MA, (1994), 11 pages.

Wang, W-H et al., "Application-Oriented Flow Control: Fundamentals, Algorithms and Fairness" IEEC/ACM Transactions on Networking, vol. 14, No. 6, Dec. 2006, 10 pages.

Yousafzai, A., et al., "Cloud Resource Allocation Schemes: Review, Taxonomy, and Opportunities.", Knowl. Inf. Syst., vol. 50, (2017), pp. 347-381.

Xu, Y. et al., "Allocation of Discrete Energy on a Cloud-Computing Datacenter Using a Digital Power Grid", IEEE International Conference on Green Computing and Communications, Conference on Internet of Things and Conference on Cyber, Physical and Social Computing, (2012), 4 pages.

Zhang, Q. et al. Cloud computing: State-of-the-art and research challenges, J. Internet Ser. Appl, vol. 1, No. 1, (Feb. 25, 2010), pp. 7-18.

* cited by examiner

100

AUTOMATED INTERMEDIARY SYSTEM WITH REQUEST DATABASE AND RESOURCE POOL

CROSS-REFERENCES TO RELATED APPLICATIONS

This application claims the benefit of U.S. Provisional Patent Application No. 63/668,435, filed Jul. 8, 2024, U.S. Provisional Patent Application No. 63/725,214, filed Nov. 26, 2024, U.S. Provisional Patent Application No. 63/738,070, filed Dec. 23, 2024, and U.S. Provisional Patent Application No. 63/746,874, filed Jan. 17, 2025. Each patent application identified above is incorporated here by reference in its entirety to provide continuity of disclosure.

TECHNICAL FIELD

The present disclosure generally relates to an automated intermediary system for exchanging resources. The resources can include, but are not limited to, cloud computing resources, communication network resources, or virtual machine types. The automated intermediary system can exchange the resources using a request database and a resource pool.

SUMMARY

The disclosed embodiments include an automated intermediary system configured to exchange the resources using a request database and a resource pool. The resource pool can include a tick structure enabling resource contributors to concentrate provided resources at particular ticks in the tick structure. The automated intermediary system can exchange resources using multiplicative or additive, time dependent or time-independent invariance functions.

According to an aspect of the present disclosure, an automated intermediary system is provided. The automated intermediary system includes at least one user request database, at least one processor, and at least one non-transitory computer readable medium containing instructions that, when executed by the at least one processor, cause the automated intermediary system to perform operations. The operations include receiving resource contributions and creating a balanced resource pool using the resource contributions, the balanced resource pool including a first resource and a second resource. The operations also include receiving a user request specifying an exchange of a quantity of the first resource recorded in a user profile of a first user for the second resource. The operations further include matching the user request to one or more stored user requests in the user request database and determining a first returned resource quantity and an unsatisfied portion of the user request including a remaining resource quantity. In response to the determination of the unsatisfied portion of the user request, the operations include matching the unsatisfied portion of the user request to the resource pool and determining a second returned resource quantity based on the remaining resource quantity and current quantities of the first and second resources in the resource pool. The operations also include updating the user profile of the first user based on the first and second returned resource quantities. In response to a request from the first user, the operations include withdrawing a portion of the first and second returned resource quantities from the automated intermediary system and updating the user profile of the first user.

According to other aspects of the present disclosure, the automated intermediary system may include one or more of the following features. The first and second resources may comprise cloud computing resources, communication network resources, or virtual machine types. The balanced resource pool may include a tick structure, and the resource contributions may be allocated to ticks in the tick structure. Determining the second returned resource quantity may comprise determining a current tick in the tick structure, determining a maximum provided quantity of the first resource based on real and virtual quantities of the first and second resources in the current tick, determining the maximum provided quantity of the first resource exceeds a remaining submitted quantity of the first resource, and determining the second returned resource quantity based on the remaining submitted quantity of the first resource. The resource pool may include base units, partially-complete units, or complete units. The second returned resource quantity may be determined based on a base, partially-complete, or complete exchange ratio for the resource pool. The second returned resource quantity may be determined according to an invariant function. The invariant function may comprise an additive or multiplicative invariant function. The invariant function may be a time-dependent invariant function. The quantity of the first resource recorded in the user profile may comprise a quantity of bundled resources obtained from a second user. Determining the second returned resource quantity may further comprise determining a diverted resource quantity.

According to another aspect of the present disclosure, a set of non-transitory computer-readable media is provided. The set of non-transitory computer-readable media collectively contains instructions that, when executed by at least one processor, cause an automated intermediary system to perform operations. The operations include receiving resource contributions and creating a balanced resource pool using the resource contributions, the balanced resource pool including a first resource and a second resource. The operations also include receiving a user request specifying an exchange of a quantity of the first resource recorded in a user profile of a first user for the second resource. The operations further include matching the user request to one or more stored user requests in a user request database and determining a first returned resource quantity and an unsatisfied portion of the user request including a remaining resource quantity. In response to the determination of the unsatisfied portion of the user request, the operations include matching the unsatisfied portion of the user request to the resource pool and determining a second returned resource quantity based on the remaining resource quantity and current quantities of the first and second resources in the resource pool. The operations also include updating the user profile of the first user based on the first and second returned resource quantities. In response to a request from the first user, the operations include withdrawing a portion of the first and second returned resource quantities from the automated intermediary system and updating the user profile of the first user.

According to other aspects of the present disclosure, the set of non-transitory computer-readable media may include one or more of the following features. The first and second resources may comprise cloud computing resources, communication network resources, or virtual machine types. The balanced resource pool may include a tick structure, and the resource contributions may be allocated to ticks in the tick structure. Determining the second returned resource quantity may comprise determining a current tick in the tick structure, determining a returned quantity of the second resource for the current tick, determining a maximum provided quantity of the first resource based on real and virtual quantities of the first and second resources in the current tick, determining the maximum provided quantity of the first resource exceeds a remaining submitted quantity of the first resource, and determining the second returned resource quantity based on the remaining submitted quantity. The resource pool may include base units, partially-complete units, or complete units. The second returned resource quantity may be determined based on a base, partially-complete, or complete exchange ratio for the resource pool. The second returned resource quantity may be determined according to an invariant function. The invariant function may comprise an additive or multiplicative invariant function. The invariant function may be a time-dependent invariant function. The quantity of the first resource recorded in the user profile may comprise a quantity of bundled resources obtained from a second user. Determining the second returned resource quantity may further comprise determining a diverted resource quantity.

The foregoing general description and the following detailed description are exemplary and explanatory only and are not restrictive of the claims.

DETAILED DESCRIPTION

Figure 1:
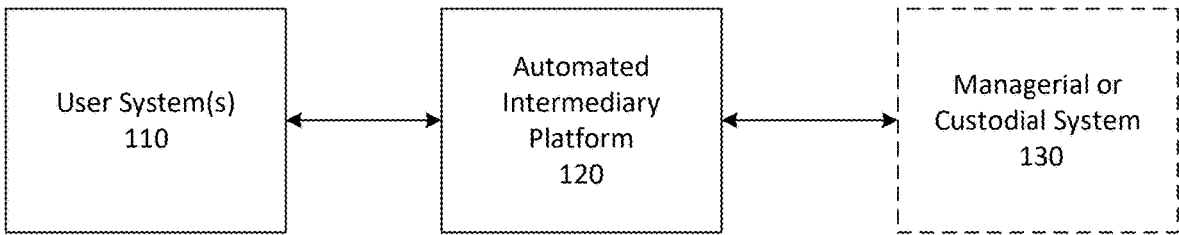
FIG. 1 is an exemplary block diagram illustrating a system using an automated intermediary platform, consistent with the disclosed embodiments.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting. As such, those skilled in the art will appreciate that the conception upon which this disclosure is based may readily be utilized as a basis for designing other structures, methods, and systems for carrying out the several purposes of the present disclosure. Reference will now be made in detail to the present exemplary embodiments of the invention, examples of which are illustrated in the accompanying drawings. Wherever possible, the same reference numbers will be used throughout the drawings to refer to the same or like parts.

Automatic, rapid coordination of resource transfers can facilitate the efficient use of resources, such as a cloud computing resources, communication network resources, or other suitable resource as described herein. However, conventional cloud computing platforms, communications networks, or other suitable entities as described herein, lack mechanisms for enabling users to discover each other, coordinate or bundle resources for exchange, or ensure that resources will be available for exchange as needed. Furthermore, such platforms may lack mechanisms for addressing additional obligations that travel with these resources (e.g., cloud computing account payments, or other obligations that might travel with such resources). The lack of such mechanisms can result in inefficient resources allocation.

As a non-limiting example of discovery failure, a first user may be entitled to use an instance of a first type of virtual machine (e.g., according to a cloud computing account configuration), but may temporarily require an instance of a second type of virtual machine for some task. A second user may be entitled to use an instance of a second virtual machine (e.g., according to a cloud computing account configuration), but may be willing to use the first type of virtual machine instead. Thus, the first and second users would benefit from exchanging entitlements to use the first and second types of virtual machines. However, conventional systems may lack mechanisms enabling the first and second users to discover each other.

As a non-limiting example of coordination failure, a first user may be entitled to a first quantity of bandwidth on a communication network, but may desire instead a dedicated network connection on the communication network. A second user may be willing to exchange a dedicated network connection on the network for a second quantity of bandwidth on the communication network. However, the second quantity of bandwidth may be greater than the first quantity of bandwidth (i.e., greater than what the first user can exchange). A third user may be entitled to a third quantity of bandwidth on the network, which the third user may not be using. Thus, the first and second users would benefit from the first user bundling the first and third quantities of bandwidth together and exchanging the bundled bandwidth with the second user for the dedicated network connection. However, conventional systems may lack mechanisms enabling the first, second, and third users to coordinate or bundle resources for this exchange.

As a non-limiting example of unavailability failure, a first user may be entitled to a quantity of cloud compute storage on a cloud computing platform, some of which may be unused. The first user may wish to automatically obtain additional compute on the cloud computing platform as needed for executing programs. Rather than obtaining the additional compute from the cloud computing platform, the first user may wish to exchange unused storage for additional compute. But unless the first user can expect that additional compute will be available for exchange, the first user may be unwilling to rely on automatically exchanging storage for compute as needed. The first user would therefore benefit from an increased likelihood that resources would be available for exchange as needed. However, conventional systems may lack mechanisms to ensure or increase the likelihood of resource availability.

Automated intermediary platforms consistent with disclosed embodiments can enable users to discover other users, coordinate resource exchanges, bundle resources for exchange, and ensure that resources will be available for exchange as needed. Furthermore, automated intermediary platforms can provide mechanisms for addressing additional obligations that travel with these resources (e.g., additional resource components, as described herein). For example, as described herein, a user can decide whether to exchange a resource, while retaining the additional obligation associated with the resource (e.g., exchanging a base unit, as described herein), or exchange both the resource and the obligation (e.g., exchanging a partially-complete or complete unit, as described herein).

Automated intermediary platforms consistent with disclosed embodiments can enable users to automatically and immediately exchange resources without requiring the coordinated action of an extensive network of users of intermediaries (e.g., computing systems, third party API intermediaries, or other such intermediaries). In some embodiments, such automated intermediary platforms can maintain both a request database and a resource pool. When the automated intermediary platform receives a user request, in some embodiments, the automated intermediary platform may optionally attempt to match the user request to one or more requests in the request database. In such embodiments, the automated intermediary platform can match requests based on request characteristics (e.g., request recency, requested exchange quantity, exchange ratio, request conditions. or the like). Should the automated intermediary platform fail to identify a match, the automated intermediary platform can match the user request to a resource pool. In this manner, the resource pool can increase the likelihood that a user request can be satisfied.

Automated intermediary platforms consistent with disclosed embodiments can handle large volumes of exchanges. The platform can match a received user request to the request database extremely quickly. Furthermore, the automated intermediary platform can publish (or otherwise make available) the request database, enabling users to see outstanding user requests. Should a user require immediate access to a resource (or have resources available for immediate use) they can use the outstanding user requests data to submit a matching user request.

Automated intermediary platforms consistent with disclosed embodiments can expose an application interface for receiving user request from other systems. Users can therefor construct programs that interact with the automated intermediary platforms to exchange resources as-needed, or according to criteria determined by the user. For example, a user can develop an application that flexibly accommodates changes in end-user traffic or usage by trading memory against compute, or trading general-purpose virtual machines for high-performance virtual machines as needed, or according to criteria determined by the user.

Automated intermediary platforms consistent with disclosed embodiments can be configured to automatically interface with managerial or custodial system that manage, control access to, or otherwise hold, the resources. As may be appreciated, an automated intermediary platform consistent with disclosed embodiments may represent resources available for exchange or bundling with units. Users can then interact with the automated intermediary platform to exchange the resources. However, the automated intermediary platform may not directly control access to, or otherwise hold, the resources. Instead, the automated intermediary platform can provide instructions to the managerial or custodial systems. In some embodiments, the same entity can control both the automated intermediary platform and the managerial or custodial system. In some embodiments, a third party can control the managerial or custodial system. In some embodiments, a user can transfer the resource to a managerial or custodial system associated with the automated intermediary platform. The automated intermediary platform can then transfer the resource to a third party managerial or custodial system, while representing the resource on the automated intermediary platform using resource units, as described herein.

Consistent with disclosed embodiments, an automated intermediary platform can be configured to support exchange of continuous-valued resources (e.g., compute time, communication network bandwidth, memory, or the like), discrete-valued resources (e.g., processors, communication network connections, storage systems, or the like), or sets of continuous or discrete-valued resources. For example, a set of continuous-valued resources can include compute time on different computing clusters, or under the authority of different users. As an additional example, a set of discrete-valued resources can include a collection of network communication channels (or a collection of color channels on a single network communication channel, or the like). In some embodiments, an automated intermediary platform can represent using a unit a discrete-valued resource, a quantity of a continuous valued resource, or a set of resources. For example, one unit of a first resource could represent 100 minutes of compute time, one unit of a second resource could represent 1 Gbps bandwidth on a network connection, or one unit of a third resource could represent a dispatchable cluster of 10 computing systems configured for training machine learning models.

Automated intermediary platforms consistent with disclosed embodiments can be configured to support pools of resources. A user can interact with the automated intermediary platform to contribute resources into the pool, withdraw resources from the pool, or exchange different types of resources contained in the pool. For example, a user can contribute unused network bandwidth to a pool including network bandwidth in two communication networks. Another user can then exchange network bandwidth in one communication network for bandwidth in the other communication network (e.g., a peer-to-pool exchange). In some embodiments, as may be appreciated, the underlying grant of the network bandwidth (the resource) can be time-limited. As described herein, the rules for exchanges can reflect the time-limited nature of the underlying resource. In some embodiments, the automated intermediary platform can support providing, exchanging, and withdrawing resources without requiring manual intervention or third-party intermediaries. In this manner, the disclosed embodiments can enable more convenient, transparent, and flexible exchanges of resources, allowing for more-efficient resource allocations.

Automated intermediary platforms consistent with disclosed embodiments can offer greater uptime or availability than manually intermediated exchanges. For example, such automated intermediary platforms can offer 24-hour availability every day of the week.

Automated intermediary platforms consistent with disclosed embodiments can enable bundling of resources. For example, one active user can perform exchanges on behalf of other passive users. The passive users can provide resources to the active user, which can then exchange the provided resources, together with any resources contributed by the active user. In some embodiments, an automated intermediary platform can be managed by such a passive user, which may rely on the expertise of various active users to efficiently allocate the unused resources it provides.

Automated intermediary platforms consistent with disclosed embodiments can enable division of sets of resources (or continuously valued resources) into smaller subsets. For example, an automated intermediary platform can establish a compute pool that assigns a unit to each contribution of 100 minutes of compute time (or to each dispatchable cluster of 10 computing systems configured for training machine learning models). The automated intermediary system can accept requests for fractional exchanges (e.g., 51 minutes of compute time, use of 2 computing systems in a cluster for training models, etc.). The ability to support such fractional exchanges can enable users with smaller resource needs to take advantage of these systems.

Automated intermediary platforms consistent with disclosed embodiments can address the potential for contribution loss. Such contribution loss can occur when an automated intermediary platform maintains a pool including two resources (e.g., compute time and memory) having an exchange ratio. A user can contribute quantities of the two resources in accordance with the exchange ratio. Such a contribution may not affect the exchange ratio. In return for the contribution, the automated intermediary platform may grant the user a "share" of the resources in the pool. Another user may then exchange, for example, unused memory for compute. This exchange can affect the exchange ratio. Should the user withdraw their "share" of the two resources in the pool, the change in exchange ratios can result in them receiving less than had they not contributed to the pool. Mechanisms for addressing such contribution loss are described herein.

Automated intermediary platforms consistent with disclosed embodiments can enable contributors to a pool to associate contributed resources with exchange ratio ranges (e.g., concentrated resource contributions). In some embodiments, automated intermediary platforms can integrate a tick mechanism (e.g., concentrating contributions within exchange ratio ranges (ticks)). Exchange ratios may be sufficiently predictable or stable for some pairs of resources that concentrated resource contributions may provide a more refined way to manage resource contributions and exchanges. Therefore, some disclosed embodiments may add a layer of precision (e.g., concentrated resource contributions) in the form of individual ticks that may enable contributors to have greater control over their resource deployment. The automated intermediary platform (and users thereof) can also benefit from such concentrated resource contributions, which can provide greater stability in exchange ratios, in particular during large exchanges.

Consistent with disclosed embodiments, a tick can refer to an exchange ratio range within which resources are contributed. For example, each tick may represent a specific exchange ratio range in which a contributor may choose to contribute resources. In some embodiments, tick boundaries can be defined by lower ratio limits and upper ratio limits. A tick may be associated with real and/or virtual quantities of one or more resources (e.g., the resources being represented with the automated intermediary platform by one or more units).

In some embodiments, ticks may be defined based on one or more anchor ratios calculated using historical data (e.g., average ratio over a number of days, most recent ratio, etc.). In some embodiments, an anchor ratio may update periodically. In some embodiments, the ticks can be expressed as a proportion or percentage of the anchor ratio (e.g., a lower or upper ratio limited can be expressed as 0, 1%, 2%, . . . 99%, 100%, . . . 199%, 200% of the anchor exchange ratio). In some embodiments, each tick may span a 1% range from the anchor ratio. In some embodiments, a number of ticks may depend on the anchor ratio and a pool configuration. For example, there may be 200 ticks ranging from 0 to 200% of the anchor ratio. In some embodiments, a highest upper ratio limit of all ticks may not exceed 1. For example, if an anchor ratio is 0.4, a pool may consist of 200 ticks. Alternatively, if an anchor ratio is 0.8, a pool may have 125 ticks.

In some embodiments, a resource contributor can interact with an automated intermediary platform to associate contributed resources with a particular exchange ratio range defined by one or ticks. For example, the resource contributor can associate contributed resources in an exchange ratio range in which the resource contributor expects greater exchange activity. In some embodiments, real resource quantities in each tick may be determined by a total contribution of all resource contributor. In some embodiments, contributed resources can be available for exchange when those contributed resources are associated with an exchange ratio range including the current exchange ratio. For example, the current exchange ratio for a pool can determine a current tick. Only contributed resources associated with the current tick may be active. In some embodiments, all resources associated with other ticks may be inactive until all the resources associated with the current tick are exchanged. The exchange ratio may then move to a next tick, making the next tick the current tick. In some embodiments, the automated intermediary platform can be configured to grant a portion of resources exchanged to a user that 1) contributed resources to the pool and 2) associated the contributed resources with an exchange ratio range including the current exchange ratio.

Automated intermediary platforms can support bundling of resources, consistent with disclosed embodiments. An automated intermediary platform can enable an active user to obtain resources from one or more passive users. The active user can then exchange these resources for other resources. The active user can return a quantity of the exchanged resources (or a quantity of the obtained resources) to passive user. For example, an active user may have 1 Gb of cloud storage available. The active user may need 100K API tokens for a large language model provider. A pool may include cloud storage and the API tokens at a 1 Gb: 1 K API token exchange ratio. Accordingly, the active user may obtain 99 Gb of cloud storage from passive users and exchange the 100 Gb of cloud storage for the required 100K API tokens. The active user may later return 99 Gb of cloud storage (or a different quantity, such as a larger quantity) to the passive users. This scenario may be appealing to an active user that anticipates being able to obtain (and thus return) the 99 Gb of cloud storage more easily in the future (e.g., when a change in processing tasks or end-user activity frees up storage space, or the like). Return of the tokens may be enforced by the automated intermediary platform. In some instances, when the returned quantity is greater than the obtained quantity, the difference can be divided into batches of additional resources. The automated intermediary platform can cause the active user to return such batches at specified intervals.

FIG. 1 is an exemplary block diagram illustrating a system 100 using an automated intermediary platform 120, consistent with the disclosed embodiments. As shown in FIG. 1, system 100 may include user system(s) 110, automated intermediary platform(s) 120, and optionally managerial or custodial system(s) 130.

User system(s) 110 may be any device accessible by users, such as computers, mobile devices (e.g., smartphones, tablets, laptops, etc.), online terminals, or other electronic devices operable to access web-based platforms. For example, user system(s) 110 may be implemented as devices configured to present interfaces accessible by users to access websites and/or applications to interact with platforms, such as automated intermediary platform(s) 120. Consistent with the present disclosure, user device(s) may be configured to allow users to set up, upload and control the full or partial access to their data. User system(s) 110 may be configured to allow users to manage their user profiles, enter user requests, provide or receive batches of additional resources, onboard/offboard resources, and contribute resources to pools. Additionally, user system(s) 110 may be configured to allow users to view current exchange ratios (of various types, as described herein) for various resource pools. User system(s) 110 may include hardware (e.g., one or more computers, including processors, storage, and input/output devices) and/or software (e.g., one or more applications) that deliver web content that can be accessed by, for example a user through a network, such as the Internet.

Automated intermediary platform(s) 120 may be any system comprised of one or more servers or one or more services configured to perform steps related to exchanging resources. For example, automated intermediary platform(s) 120 may be implemented on a GraphQL-based database using Firebase and/or other microservice architecture. Additionally or alternatively, automated intermediary platform(s) 120 may utilize block explorer services (e.g., web-based tool or application) to search for real-time or historical information stored on one or more blockchains or blockchain networks. For example, block explorer services may allow automated intermediary platform(s) 120 to track and verify information about resources (e.g., resource exchange ratios or quantities, number of exchanges, additional resource information associated with resources, such as time or quantity of additional resources provided or to be provided, or any action related to such resources), blocks, or other on-chain activities of a blockchain. Additionally or alternatively, automated intermediary platform(s) 120 can publish such information about resources on one or more blockchains. For example, automated intermediary platform(s) 120 may publish all transaction information on a public blockchain (e.g., Ethereum, Solana).

Additionally or alternatively, automated intermediary platform(s) 120 may utilize cloud computing infrastructure to improve the operations of automated intermediary platform 120. For concreteness and convenience of disclosure, automated intermediary platform 120 is described as using AWS (Amazon Web Services), but this disclosure is not intended to be limiting. Other cloud computing platforms can be used, such as GCP (Google Cloud Platform) services, AZURE, IBM CLOUD, or any other suitable computing system, cluster, or platform configurable for exposing application programming interfaces (APIs) for browsing datasets, enabling public access, supporting visual dashboards, or other functionality consistent with disclosed embodiments. For example, automated intermediary platform(s) 120 may utilize AWS services to support automated intermediary platform(s) 120 with one or more of providing web-based interfaces for users to interact with resource pools and exchange services, handling data processing, storing data, monitoring or logging metrics, distributing resources or traffic during high traffic or rapidly changing exchange ratio conditions, enhancing security, or building or deploying machine learning models for exchange ratio prediction, risk analysis, or resource exchange optimization. In some embodiments, systems and methods as disclosed herein can be implemented using BigQuery public datasets, SQL interfaces, AWS data exchange, S3 public buckets, research or scientific data repositories, or suitable data visualization and dashboarding tools. In some embodiments, automated intermediary platform(s) 120 may utilize AWS to track and verify information about resource exchanges. For example, automated intermediary platform(s) 120 may utilize AWS to create a hash and cryptographically verify every resource exchange. Additionally or alternatively, automated intermediary platform(s) 120 may utilize AWS to publish all resource exchange information such that all resource exchange information is publicly accessible. In some embodiments, automated intermediary platform(s) 120 may communicate with AWS to receive real-time resource exchange information.

In some embodiments, all publicly available resource exchange information may be pseudonymized (e.g., de-identification where data, such as personal data, is replaced with a placeholder value to protect identity of an entity associated with a resource exchange).

Automated intermediary platform(s) 120 can improve upon conventional methods of exchanging resources by making resource exchange information publicly accessible. In some embodiments, automated intermediary platform(s) 120 can implement an open-source platform where users have access to real-time resource exchange information. In addition, disclosed embodiments may reduce a number of computational resources required to perform search and discovery related to resource exchange information, thereby improving processing efficiency of Automated intermediary platform(s) 120.

Automated intermediary platform(s) 120 may include hardware (e.g., one or more computers, including processors, storage, memory) and/or software dedicated to the efficient execution of procedures (e.g., programs, routines, scripts) for supporting its applied applications. In some embodiments, automated intermediary platform(s) 120 may comprise one or more services related to automated resource transfer. In some embodiments, automated intermediary platform(s) 120 may be configured for peer-to-pool resource transfers. For example, automated intermediary platform(s) 120 may allow users to contribute to or remove resources from a resource pool (e.g., proportions or shares of the resource pool, or the like) without the need for an intermediary by using a service to manage the pools.

For example, automated intermediary platform(s) 120 can enable users to access exchange-related exchange ratio data. Thus, automated intermediary platform(s) 120 can support the efficient allocation of resources exchanged and reduce informational and material barriers to the same. In some embodiments, automated intermediary platform(s) 120 may be configured to additionally or alternatively access additional intermediaries (e.g., additional intermediaries that use a request database and coordination engine model, or request for quotation models, or other conventional models for supporting resource transfers). In some embodiments, automated intermediary platform(s) 120 may be configured specifically for low latency and high throughput. For example, automated intermediary platform(s) 120 may be configured to support the high user request throughput required for request database and coordination engine models, which may involve numerous small exchanges.

In some embodiments, system 100 may include one or more networks (not pictured) to facilitate communications and data transfer between the entities of system 100. For example, entities of system 100 may communicate with each other utilizing cloud computing technologies. Additionally or alternatively, several entities of system 100 may communicate via the internet. System 100 may implement any type of network(s) that allows the entities (shown and not shown) included in FIG. 1 to exchange data and information.

In some embodiments, automated intermediary platform(s) 120 may aggregate (and optionally display) user requests concerning a particular resource. Automated intermediary platform(s) 120 may then automatically match user requests requesting a resource with user requests providing the resource. For example, automated intermediary platform(s) 120 may be configured to use request database(s) and coordination engine(s). The coordination engine can prioritize user requests for matching based on predefined rules (e.g., rules related to exchange ratio or request priority). In some embodiments, automated intermediary platform(s) 120 can enable processing and matching of user requests almost instantaneously. For example, automated intermediary platform(s) 120 may be able to receive and process a request from a co-located user, effectuating a resource exchange, within 1 microsecond. Such a user may provide requests from computing device physically co-located with the computing devices implementing the automated intermediary platform(s) 120 (e.g., located within 100 m of the devices, or the like). Similarly, automated intermediary platform(s) 120 may be able to conduct a transaction associated with a predetermined or high-volume user within 5 to 30 microseconds. Similarly, automated intermediary platform(s) 120 may be able to conduct a transaction associated with a previously unknown or low-volume user within 5 to 50 milliseconds. Similarly, automated intermediary platform(s) 120 may be able to conduct a conditional user request within seconds. A conditional user request may not occur unless conditions are satisfied. Such conditions can depend on the exchange ratio for a pair of resources.

As described herein, automated intermediary platform(s) 120 can display information concerning aggregated user requests (e.g., real quantities, exchange ratios, etc.) to users. This information can enable users to efficiently allocate resources through resource exchanges. In some embodiments, automated intermediary platform(s) 120 can record exchange quantities, times, and ratios for subsequent review or consideration. In some embodiments, automated intermediary platform(s) 120 can be configured to operate in a scalable infrastructure capable of parallel processing and/or efficient resource management. For example, automated intermediary platform(s) 120 can be configured to be latency-sensitive and handle a large number (e.g., thousands, hundreds of thousands) of transactions per second. In some embodiments, automated intermediary platform(s) 120 can be configured to process user requests in real-time. For example, automated intermediary platform(s) 120 can update a request database as requests are received. Updating the request database can include determining request priority (e.g., depending on complex rules based on exchange ratio and time). In some embodiments, automated intermediary platform(s) 120 can continuously (e.g., routinely, every few minutes, every few seconds, every few milliseconds) broadcast information about resource exchanges, as described herein, to users of automated intermediary platform(s) 120.

Consistent with disclosed embodiments, configuring automated intermediary platform(s) 120 to use request database(s) and coordination engine(s) can improve the technical performance of automated intermediary platform(s) 120. For example, such an implementation can enable automated intermediary platform(s) 120 to handle high exchange volumes with minimal latency. Furthermore, in some embodiments, configuring automated intermediary platform(s) 120 to use request database(s) and coordination engine(s) can reduce downtime through the use of multiple layers of redundancy (e.g., backup servers, data replication, failover mechanisms). Furthermore, in some embodiments, such an implementation may improve security of financial data via encryption, authentication, and/or regular security audits. Furthermore, in some embodiments, such an implementation may enable automated intermediary platform(s) 120 to centralize and organize user requests to ensure transparent and efficient resource exchange.

Consistent with disclosed embodiments, managerial or custodial system(s) 130 can control resources provided by users to automated intermediary platform 120. As may be appreciated, different resources can be held by different managerial or custodial system(s) 130. For example, cloud compute or memory can be held by a cloud computing platform. Automated intermediary platform 120 can be configured to interact with the cloud computing platform to effectuate exchanges of compute or memory between users of the automated intermediary platform 120. Similarly, a communications network controller or management system can be configured to allocate bandwidth to satisfy demands on a communications network. Automated intermediary platform 120 can be configured to interact with the cloud computing platform to effectuate exchanges of bandwidth or network connections between users of the automated intermediary platform 120. In some embodiments, managerial or custodial system(s) 130 can be independent from automated intermediary platform 120. For example, different entities can control or operate automated intermediary platform 120 and one or more of managerial or custodial system(s) 130. In some embodiments, the same entity can control or operate automated intermediary platform 120 and one or more of managerial or custodial system(s) 130.

Figure 2:
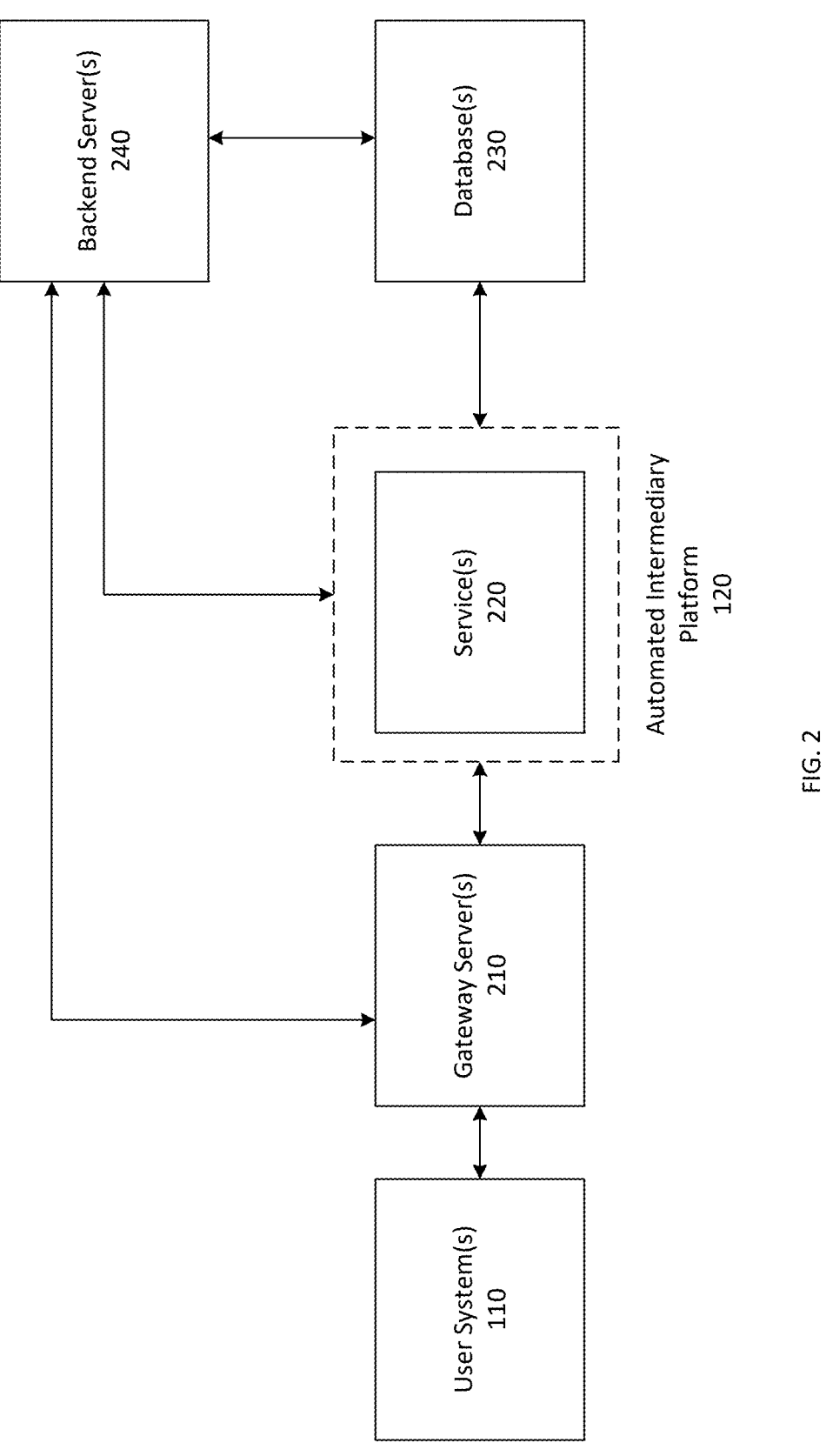
FIG. 2 is an exemplary block diagram illustrating an implementation of a resource coordination system, consistent with the disclosed embodiments.

FIG. 2 is an exemplary block diagram illustrating an implementation of a system 200 for coordinating resource transfers, consistent with the disclosed embodiments. As shown in FIG. 2, system 200 may include user system(s) 110 (e.g., of FIG. 1), automated intermediary platform(s) 120 (e.g., of FIG. 1), gateway server(s) 210, services 220, database(s) 230, and backend server(s) 240.

Gateway server(s) 210 may be comprised of one or more servers that fulfill user requests for content on websites. For example, gateway server(s) 210 may be comprised of both software and hardware that uses protocols (e.g., HTTP, HTTPS) to respond to requests received from user system(s) 110 (e.g., received via the internet). Gateway server(s) 210 may provide a unified API endpoint for users to interact with other entities of system 200. For example, gateway server(s) 210 may act as an interface for user system(s) 110 to interact with automated intermediary platform(s) 120. Gateway server(s) 210 may route one or more requests from user device(s) to appropriate service(s) 220 of automated intermediary platform(s) 120. Gateway server(s) 210 may include one or more components that perform processes consistent with the disclosed embodiments. For example, gateway server(s) 210 may include one or more computers (e.g., servers, database systems, etc.) configured to execute software instructions programmed to perform aspects of the disclosed embodiments.

Database(s) 230 may include one or more memory devices that store information from various data sources (e.g., from any entity of system 200). For example, database(s) 230 may store data including one or more of exchange records (e.g., resource database 305, bundling database 312, request database 314, exchange database 309 of FIG. 3), pool information (e.g., pool database 307 of FIG. 3), user profile details (e.g., user database 303 of FIG. 3), or any other details used or generated by automated intermediary platform(s) 120. While database(s) 230 is illustrated as being included in system 200, one or more databases of database(s) 230 may alternatively be located remotely from system 200. In some embodiments, database(s) 230 may be incorporated into automated intermediary platform(s) 120 and/or any other entities of system 200. Database(s) 230 may include computing components (e.g., database management system, database server, etc.) configured to receive and process requests for data stored in memory devices of database(s) 230 and to provide data from database(s) 230. In some embodiments, database(s) 230 can be implemented using suitable data repositor(ies) and a suitable processing architecture for servicing database requests (e.g., a microservices or distributed system architecture, or another suitable architecture).

In some embodiments, backend server(s) 240 can be configured to implement one or more microservices related to automated intermediary platform(s) 120. For example, backend server(s) 240 may include microservices for at least one of authentication (e.g., Firebase authentication, to ensure user login and access control to protect user profiles and user interactions with automated intermediary platform(s) 120) or notification (e.g., Firebase cloud messaging, to send real-time notifications to user system(s) 110 related to automated intermediary platform(s) 120, such as exchange confirmations or changes in resource pools).

In some embodiments, system 200 may include one or more networks (not pictured) to facilitate communications and data transfer between the entities of system 200. For example, entities of system 200 may communicate with each other utilizing cloud computing technologies. Additionally or alternatively, several entities of system 200 may communicate via the internet. System 200 may implement any type of network(s) that allows the entities (shown and not shown) included in FIG. 2 to exchange data and information.

Automated intermediary platform(s) 120 may be comprised of service(s) 220 for automated resource exchange. For example, service(s) 220 may include one or more action services (e.g., resource services, bundling services, request services, exchange services, to handle processing of a request, matching of requests, or updating exchange ratios), pool management services (e.g., contributing/removing resources from resource pools and/or updating resource pool quantities, distributing batches of additional resources to resource contributors, ensuring that pools including sufficient resources for exchange), user management services (e.g., ensuring secure access to automated intermediary platform(s) 120 by managing user authentication, user profiles, permissions), or analytics/reporting services (e.g., generating reports and/or analytics on exchange volumes, quantities, user activity and/or engagement).

Automated intermediary platform(s) 120 may comprise a platform configured to create one or more resource pools. Automated intermediary platform(s) 120 may create a resource pool in response to obtaining contributions of one or more resources. For example, automated intermediary platform(s) 120 may create one or more resource pools based on receiving contribution requests from one or more resource contributors specifying quantities of resources to contribute. In some embodiments, the resource contributor can be a user of automated intermediary platform(s) 120. In some embodiments, the resource contributor can control automated intermediary platform(s) 120. Automated intermediary platform(s) 120 can be configured to receive contribution (e.g., onboarding) or withdraw (e.g., offboarding) requests related to one or more resources from one or more resource contributors. In response to receiving a contribution or withdrawal request concerning resources in a resource pool, automated intermediary platform(s) 120 may automatically enforce reception or withdrawal of the resources. For example, in response to receiving a contribution request specifying that resources be included in a selected resource pool, automated intermediary platform(s) 120 may automatically add the specified resources to the selected resource pool. Automated intermediary platform(s) 120 may be configured to then record the contribution in a user profile of the resource contributor. The user profile can record the resources (e.g., type, quantity, resource pool contributed to, etc.) associated with the resource contributor. In some instances, a resource can be bundled together with an entitlement to additional resources. The resources can be the same type, or a different type. For example, a cluster of 10 computing systems can be bundled together with an entitlement to cloud storage. The cloud storage may not be immediately available. Instead, the cloud storage may become available when conditions are satisfied (e.g., the passage of time, use of the cluster for training or generation of a machine learning model, or the like). As an additional example, a resource can be a collection of network connections, with additional network connections becoming available at fixed intervals. In this manner, a resource can include a base component and one or more additional resource components. Automated intermediary platform(s) 120 may create or preserve a distinction between the base component, any additional resource components with satisfied conditions (available additional resource components), and any additional resource components with unsatisfied conditions (unavailable additional resource components).

In some embodiments, in response to a withdrawal request, the automated intermediary platform(s) 120 can transfer management or control over the resource to a user system (e.g., user system 110, or the like), or a service provider associated with the user system. In some embodiments, when the automated intermediary platform(s) 120 does not directly manage or control the resource (e.g., when the resource has been transferred to a managerial or custodial system as described herein), the automated intermediary platform(s) 120 can ensure, effectuate, or facilitate transfer of the resource to the user system or another system designated by the user (e.g., by providing suitable instructions to the managerial or custodial system). In some instances, the resource can be transferred to a profile of the user on another computing system or platform. In some instances, management or control over the resource can be transferred to the user without transferring the resource (e.g., the user can be granted the ability to interact with a cloud computing provider to control the transferred cloud computing instances, or the like, depending on the type of resource).

In some embodiments, automated intermediary platform(s) 120 may assign an immediate exchange ratio to the base component (base ratio). This immediate exchange ratio can indicate a suitable ratio for exchanging the base component of the resource for another resource immediately, considering only the base component (and not the additional resources).

In some embodiments, automated intermediary platform(s) 120 may assign an immediate exchange ratio to the base and unavailable additional resource components (partially complete ratio). This immediate exchange ratio can indicate a suitable ratio for immediately exchanging for another resource the base and unavailable additional resource components.

In some embodiments, automated intermediary platform(s) 120 may assign an immediate exchange ratio to the base and all additional available and unavailable resource components (complete ratio). This immediate exchange ratio can indicate a suitable ratio for immediately exchanging for another resource the base component, any available additional resource components, and unavailable additional resource components. In some embodiments, in such calculations, the available additional resource components may exclude additional resources that automated intermediary platform(s) 120 has already transferred (e.g., to a user or a third-party system, or the like).

In some embodiments, automated intermediary platform(s) 120 may enable contribution or withdrawal of resources at any time. In some embodiments, automated intermediary platform(s) 120 may enable continuous resource exchanges.

In some embodiments, automated intermediary platform(s) 120 can assign a portion of a resource pool to a resource contributor based on the resources contributed to the pool. For example, when a pool includes 1000 Gb of memory and 1000K API tokens, and a user contributes 1 GB of memory and 1 K API tokens to the pool, automated intermediary platform(s) 120 can assign a 1/1001 portion of the pool to the user. In some embodiments, based on each contribution or withdrawal by a resource contributor, automated intermediary platform(s) 120 can update a portion of the resource pool held by the resource contributor. While depicted as a fraction, the portion is not so limited, but can be expressed in any suitable manner.

In some embodiments, automated intermediary platform(s) 120 may automatically provide a portion of the resources involved in any exchange involving a pool to the resource contributors that contributed to resources to that pool.

In some embodiments, automated intermediary platform(s) 120 may be configured to generate units representing quantities of resources based on interactions with users. In some instances, a user may provide a first resource and automated intermediary platform(s) 120 can generate units, each representing a quantity of that resource. In some instances, a user may provide a first resource and automated intermediary platform(s) 120 can generate units, each representing a quantity of a second resource. An exchange ratio between the first resource and the second resource can depend on characteristics of the second resource (e.g., whether the second resource including an entitlement for additional resources, the quantities, types, and availability conditions for those resources, or the like). In some embodiments, automated intermediary platform(s) 120 can be configured to enable a user to obtain only a portion of a unit.

Automated intermediary platform(s) 120 may create a resource pool using an invariant function tailored for resource exchange. In some embodiments, the pool can be associated with a termination time. This termination time can be a duration before one or more of the resources or resource types in the pool becomes unavailable. In some embodiments, the invariant function can depend on this termination time (e.g., the invariant function can be time-dependent):

$$x_{end}^{(1-t)} + y_{end}^{(1-t)} = k_t = x_{start}^{(1-t)} + y_{start}^{(1-t)}$$

where:

| | |
|---|---|
| x | quantity of base unit of resource A (base unit A) in resource pool, x > 0 |
| y | quantity of base unit of resource B (base unit B) in resource pool, y > 0 |
| t | time to unavailability of resource A and resource B (if resources A and B have different unavailability dates, use the earlier date as the unavailability of the resource pool), t is normalized so that $0 \le t < 1$; at the termination time t = 0 |
| $k_t$ | constant defining relationship between quantities of base unit A and base element B in pool |

In some embodiments, automated intermediary platform(s) 120 may create a resource pool using a time-independent invariant function:

$$x_{end}*y_{end}=k=x_{start}*y_{start}$$

where:

| | |
|---|---|
| x | quantity of base unit of resource A (base unit A) in resource pool, x > 0 |
| y | quantity of base unit of resource B (base unit B) in resource pool, y > 0 |
| end, start | Start and end subscripts indicate that quantities are assessed before and after each exchange. |
| $k_t$ | constant defining relationship between quantities of base element A and base element B in pool |

As may be appreciated, the above additive, time-dependent invariant function and multiplicative, time-independent invariant function are intended to be exemplary and not limiting. For example, automated intermediary platform(s) 120 may create a resource pool using an additive, time-independent invariant function or a multiplicative, time-dependent invariant function. Or another suitable time-independent or time-dependent invariant function.

In some embodiments, automated intermediary platform(s) 120 may separate base and additional resource components of resources. For example, base units exchanged with or contributed to resource pools may each represent a base component of a resource. Automated intermediary platform(s) 120 may record additional resource components and provide the associated additional resources whenever the conditions on providing the additional resources are satisfied. Additionally or alternatively, automated intermediary platform(s) 120 may combine base and additional resource components of resources. For example, complete or partially complete units exchanged with or contributed to resource pools may each represent both the base component and one or more additional resource components, as described herein. Automated intermediary platform(s) 120 may determine a complete or partially complete ratio for exchanging these complete or partially complete units with the units in the resource pool. In some embodiments, a resource pool may comprise a combination of base units and complete or partially complete units.

In some embodiments, automated intermediary platform(s) 120 may track and update available additional resources associated with a base unit periodically (e.g., every hour, every day, every week, etc.). In some embodiments, the unit quantities in the invariant function for the resource pool can be base unit quantities, and the exchange ratio can be the complete or partially complete ratio. In such embodiments, automated intermediary platform(s) 120 may handle available additional resources separately from base components when managing an exchange of resources. For example, an exchange of x base units of resource A for y base units of resource B can be determined based on the invariant function for the resource pool (e.g., using the complete or partially complete ratio in this example). A difference in available additional resources between the two can be determined as follows:

$$i_{diff} = x * i_A - y * i_B$$

where:

| | |
|---|---|
| $i_A$ | available additional resources associated with the units of resource A |
| $i_B$ | available additional resources associated with the units of resource B |
| $i_{diff}$ | difference transferred to the user receiving the units of resource A |

In this example, the additional resource components provide additional resources of the same type. However, the disclosed embodiments are not so limited. For example, an exchange of network connections (e.g., base units of resource A) for bandwidth (e.g., base units of resource B) could involve additional resources components being additional network connections (e.g., resource A) additional components and additional bandwidth (e.g., resource B) additional components. In such embodiments, the available additional resource components can be transferred with the base components, without determining a difference as disclosed above.

In some embodiments, automated intermediary platform(s) 120 may automatically determine whether the conditions on an additional resource component associated with a base unit have been satisfied. For example, when the condition on an additional resource component is depends on elapsed time (e.g., a time since a prior additional resource component became available), automated intermediary platform(s) 120 may automatically determine whether the elapsed time condition has been satisfied.

In some embodiments, when conditions on an additional resource component associated with a base unit have been satisfied, automated intermediary platform(s) 120 can create a complete unit including the base component and the additional resource components (e.g., available and un-transferred additional resource components and unavailable resource components). Automated intermediary platform(s) 120 can then determine a complete ratio for a complete unit as described herein. Alternatively or additionally, the base unit can be replaced with a complete unit in the resource pool, the complete unit having the complete exchange ratio, or the base ratio of the existing base unit can be replaced with the complete ratio.

In some embodiments, when conditions on an additional resource component associated with a base unit have been satisfied, automated intermediary platform(s) 120 can transfer the available resources to a user. In some instances, the available additional resources can be transferred to the resource contributor that provided the base unit to the resource pool. In such embodiments, automated intermediary platform(s) 120 may not create a complete unit and the base unit may retain the base ratio. In some embodiments, automated intermediary platform(s) 120 can transfer the available additional resources when the base unit is transferred, as described herein.

In some embodiments, a resource pool may include base units for at least two resources (e.g., base units A for resource A and base units B for resource B). In some embodiments, a resource pool may include complete units for at least two resources (e.g., complete units A for resource A and complete units B for resource B). In some embodiments, a resource pool may include at least one complete unit for a first resource and at least one base unit for a second resource (e.g., complete unit A for resource A and base unit B for resource B).

In some embodiments, automated intermediary platform(s) 120 may be configured to implement request database(s) and coordination engine(s). In some embodiments, automated intermediary platform(s) 120 can match user requests recorded in a request database with a resource pool. The exchange specified by the user request can then be performed using the resource pool (e.g., according to an invariant function as described herein, or in another suitable manner). In some embodiments, automated intermediary platform(s) 120 can perform such matching until no valid matches remain. The coordination engine can be configured to perform matching according to a coordination logic. In some embodiments, the coordination engine can first attempt to match user requests in the request database. Such matches may depend on the exchange rate for the resource pool, but may not affect the exchange rate for the resource pool. Should the coordination engine be unable to match user requests in the request database, the coordination engine can match user requests to the resource pool. Such matches can result in exchanges that affect the balance of resources in the resource pool, thereby updating the exchange ratio. The updated exchange ratio may enable the coordination engine to match further user requests to user requests in the request database. If not, the coordination engine can continue to match user requests to the resource pool (thereby further affecting the exchange ratio). In this manner, the request database can speed exchanges and provide visibility into the resources that users need, while the resource pool can ensure that resources are available for satisfying user requests, despite exchange ratio limits on user requests recorded in the request database.

As may be appreciated, user requests that include exchange ratio limits may remain unfulfilled or only partially fulfilled, depending on the balance of resources in the resource pool. For example, such user requests may include a maximum or minimum exchange ratio. As resources are collected (from matching user requests or from the resource pool) the exchange ratio may shift above (or below) the maximum (or minimum) exchange ratio specified in the user request, causing automated intermediary platform(s) 120 to halt the fulfillment of the user request. In such instances, automated intermediary platform(s) 120 (or a component thereof, such as exchange service 308) may record a fulfilled part (and/or an unfulfilled part) of the user request under a profile of the user. Additionally, automated intermediary platform(s) 120 may record exchanged-out units under the profile of the user.

Automated intermediary platform(s) 120 can be configured to assign users with a role. A role may include one or more of passive user, active user, or resource contributor. Automated intermediary platform(s) 120 can be configured to allow a user to offer a resource for bundling to become a passive user. For example, automated intermediary platform(s) 120 may provide a passive user with bundle unit(s) after receiving an indication that the passive user has enabled bundling of a resource. Such bundle unit(s) may represent a quantity of the resource available for bundling and be associated with any additional resources obtained through providing the quantity of the resource for bundling.

Automated intermediary platform(s) 120 may allow a user to provide resources and thereby become an active user. Automated intermediary platform(s) 120 can receive these resources from a user intending to obtain, from passive users, the same or other resources for exchange. To discourage inefficiencies, automated intermediary platform(s) 120 can limit the quantity of resources an active user can bundle based on the quantity of resources provided by the active user. Automated intermediary platform(s) 120 can create unit(s) that represent the resources provided or the resources bundled by the active user. In some embodiments, the automated intermediary platform(s) 120 can create base, partially complete, or complete unit(s) corresponding to the base and additional resource component elements for the resources provided or the resources bundled by the active user. As described herein, automated intermediary platform(s) 120 can determine base, complete, or partially complete ratios for these unit(s).

In some embodiments, automated intermediary platform(s) 120 can impose unit-specific limits on the resources an active user can bundle. For example, the unit-specific limits can differ between active users holding base unit(s), partially complete unit(s), or complete unit(s) for a resource. For example, automated intermediary platform(s) 120 can adjust such limits for a complete unit as additional resources become available for that complete unit. Furthermore, automated intermediary platform(s) 120 can impose resource-specific limits, which may interact with the unit-specific limits.

As may be appreciated, the bundled units exchanged by an active user can be provided to automated intermediary platform(s) 120 by other users (e.g., passive users). Such users can onboard resources to automated intermediary platform(s) 120 and receive the units representing the resources in return. They can provide these units to the active user, thereby bundling the units. The active user can then exchange these units.

In some embodiments, automated intermediary platform 120 can be configured to return units from the active user back to the passive user. In some instances, the returned units can be of the same resource type as the bundled units (though not necessarily the same units, as such units can be fungible). For example, the passive user could supply unit(s) representing 5 Amazon Web Services E2 instances to an active user. The active user could then exchange the units representing 5 Amazon Web Services E2 instances for unit(s) representing 2 H-Series Azure virtual machines. The automated intermediary platform 120 could subsequently force the return unit(s) representing at least one Amazon Web Services E2 instance to the passive user. In some instances, the returned units can be of a different resource type from the units included in the bundle. For example, the automated intermediary platform 120 could subsequently force the return of unit(s) representing at least one H-Series Azure virtual machine to the passive user. In some instances, the returned units could be units recorded in the profile of the active user or units provided by the active user (e.g., in response to an indication provided by the automated intermediary platform 120 that units must be returned, or the like). In some instances, the returned units could be units exchanged for units in the profile of the active user or provided by the active user. For example, the automated intermediary platform 120 could force an exchange of unit(s) representing one of the two H-Series Azure virtual machines for unit(s) representing two Amazon Web Services E2 instance and return unit(s) representing one of the Amazon Web Services E2 instance to the passive user. In this example, unit(s) representing the other Amazon Web Services E2 instance could be returned to the profile of the active user.

In some embodiments, automated intermediary platform 120 can be configured to monitor the profiles of active users. Automated intermediary platform 120 can determine whether units must be returned from an active user to passive users that previously provided units to the active user. This determination can depend on the units recorded in the profile of the active user and the units provided by the passive users to the active user. In some embodiments, this determination can depend on the base, partially complete, or complete ratios of the units recorded in the user profile of the active user, or provided by the passive user. If so, automated intermediary platform 120 can force the return (or exchange and return) of units from the active user to the passive user(s). Automated intermediary platform 120 can perform incrementally perform such returns (or exchanges and returns), or perform them in a single return (or exchange and return), to obtain the units returned to the passive user(s). In some embodiments, automated intermediary platform 120 can keep a joint record of both returns and exchanges and returns. In some embodiments, returns can be recorded separately from exchanges and returns to clarify recordkeeping.

Automated intermediary platform 120 can interact with external platforms, consistent with disclosed embodiments. In some embodiments, the external platforms can be responsible for implementing or holding the resources represented by the units, while automated intermediary platform 120 can manage the exchange of the units representing the resources. For example, cloud computing platforms can provide compute, memory, virtual machines, or the like to multiple users. Automated intermediary platform 120 can enable users of these platforms to exchange units representing these resources across platforms. However, the ability to access and use the resources represented by the units would still be managed by the external platforms. Accordingly, as part of the exchange, automated intermediary platform 120 can interact with the platforms to acquire credentials, account information, or the like and otherwise facilitate or effectuate the exchange. Automated intermediary platform 120 provide this information to the users involved in the exchange.

Similarly, as described herein, there may be a duration associated with a resource. Automated intermediary platform 120 can be configured to interact with an external platform to transfer a resource to a user once the duration associated with the resource expires. For example, a user can provide to the automated intermediary platform 120 a network connection for a duration, which the automated intermediary platform 120 can represent with a unit provided to the user. The user can exchange this unit with another user. The other user may then have use of the connection while it possesses the unit. But once the duration expires, the use of the network connection can revert to the original user. Alternatively, the original user can remain user of the network connection until the duration expires, at which point the network connection can transfer to the current holder of the unit. In general, the quantity of the resource returned can depend on what components of the resource are recorded in the profile of the user (e.g., base component and/or additional resource components). The automated intermediary platform 120 can interact with the system managing the network to effectuate these changes of control over the network connection.

As may be appreciated, automated intermediary platform 120 can be configured to perform garbage collection once a duration associated with a resource expires. This garbage collection can include one or more of automatically removing units representing the resource from any resource pool containing such units, converting any base, partially complete, or complete units for the resource into another, unexpired resource, removing any user requests involving the resource from a request database, or the like.

Automated intermediary platform 120 may be configured to perform one or more steps including receiving a first resource contribution from a resource contributor, creating one or more resource pools including first resource units (e.g., base, partially complete, or complete units) representing quantities of the first resource, determining an exchange ratio (e.g., base, partially complete, or complete exchange ratio) for the units against second resource units (e.g., base, partially complete, or complete elements) representing quantities of another second resource in the pool, and performing one or more exchanges of first resource units for second resource units. In some embodiments, additional resources associated with first resource units in the pool can become available. Automated intermediary platform 120 may be configured to transfer at least a portion of these units representing additional resources to a profile of the resource contributor (e.g., based on the first resource units remaining in the pool, based on a share of the pool granted to the resource contributor based on the provision of the first resource contribution, or the like). In some embodiments, automated intermediary platform 120 may be configured to automatically rebalance the one or more resource pools based on exchanges involving the pools. In some embodiments, automated intermediary platform 120 may be configured to provide a user interface for users to exchange resources (e.g., as represented by corresponding units), view current or historical exchange information or user request information, or review user profile information.

Automated intermediary platform 120 may be configured to reduce a risk of contribution loss by diverting a portion of the units involved in an exchange with a resource pool to contributors to the resource pool.

Figure 3:
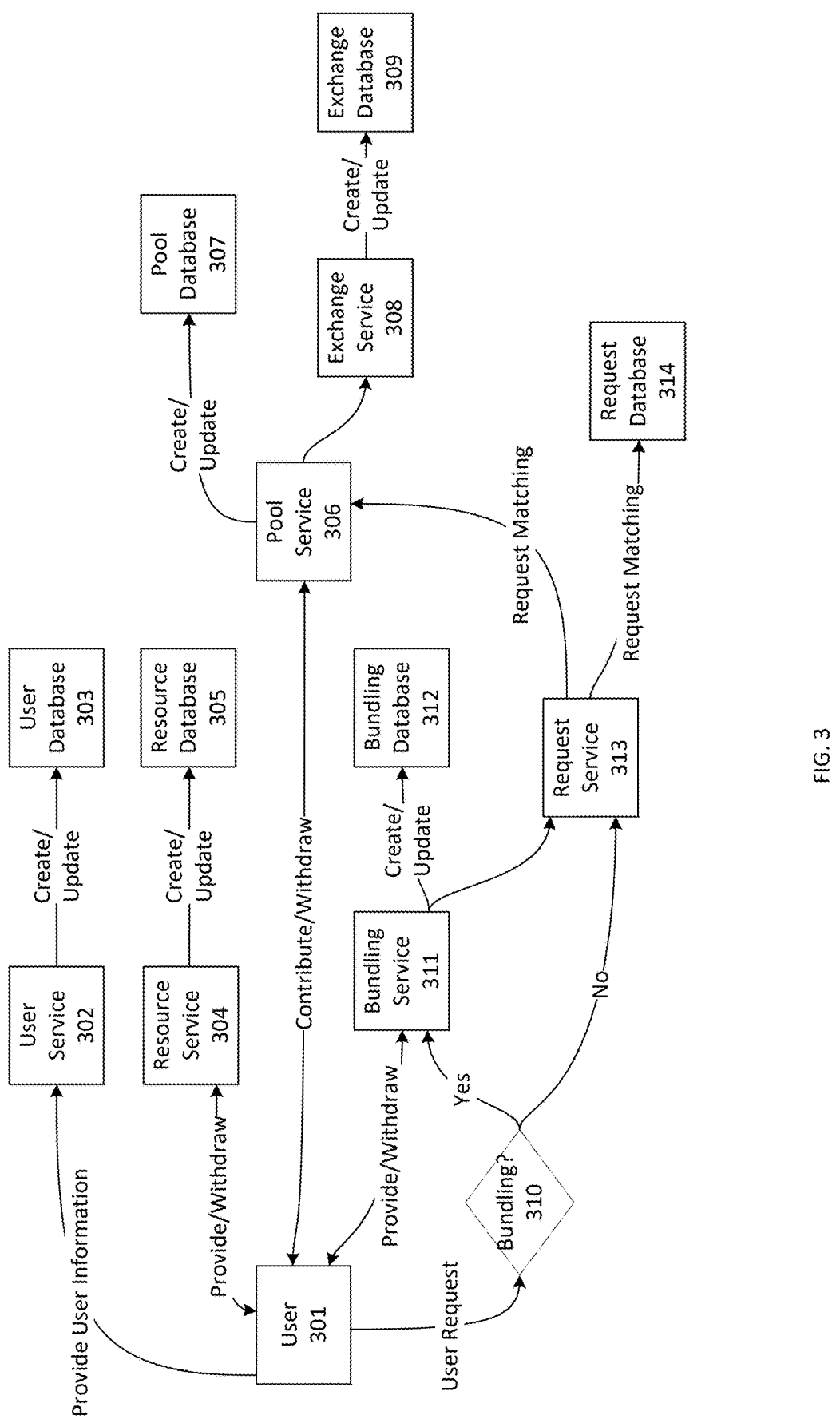
FIG. 3 is an exemplary flow diagram depicted steps concerning an automated intermediary platform, consistent with the disclosed embodiments.

FIG. 3 is an exemplary flow diagram 300 of steps related to automated intermediary platform 120 (e.g., of FIG. 1 or 2), consistent with the disclosed embodiments. Certain steps may be performed by at least one user 301. In some embodiments, certain steps can be performed by automated intermediary platform 120 or components thereof. Databases referenced in FIG. 3 can be implemented as separate or combined databases. Such databases can be implemented using suitable data repositor(ies) and a suitable processing architecture, as described herein.

Automated intermediary platform 120 may allow user 301 to access (e.g., using user system(s) 110 of FIG. 1 or 2) automated intermediary platform 120. Automated intermediary platform 120 can modify (e.g., create, register, update, delete, or the like) user information associated with user 301 using user service 302 (e.g., service(s) 220 of FIG. 2). In some embodiments, such as when there is no existing profile associated with user 301 stored in user database 303, user service 302 may create a new profile using the registered user information associated with user 301 and may store the new profile in user database 303. In some embodiments, such as when there is an existing profile associated with user 301 stored in user database 303, user service 302 may update the existing profile using the updated user information associated with user 301. Once a profile associated with user 301 is stored in user database 303, automated intermediary platform 120 allows user 301 to access one or more additional services of automated intermediary platform 120.

Automated intermediary platform 120 may allow user 301 (e.g., after a profile associated with user 301 is stored in user database 303) to provide or withdraw one or more resources using resource service 304 (e.g., third-party service, service(s) 220 of FIG. 2). In some embodiments, the user can provide a resource in exchange for units (e.g., base, partially complete, or complete elements) representing the resource or another resource. In some embodiments, the units (or the resources) associated with user 301 may be recorded in the profile of user 301. In some embodiments, such as when there is no record associated with user 301 in resource database 305, resource service 304 may create a record recording the provision or withdrawal of resources. In some embodiments, resource service 304 may create or update a record recording each provision or withdrawal associated with user 301 in resource database 305.

In some embodiments, resource service 304 may transfer resources into and out of automated intermediary platform 120. For example, resource service 304 may transfer provided resources into automated intermediary platform 120 (e.g., resources provided by a user or obtained from a third-party platform, or the like). Additionally or alternatively, resource service 304 may interact with an external platform, as described herein, to transfer the provided resources (e.g., custodian accounts in an external platform, which may or may not be a third-party platform as described herein).

In some embodiments, resource service 304 may transfer withdrawn resources to user 301 (e.g., using user system(s) 110 of FIG. 1 or 2). In some embodiments, resource service 304 may create resources. Additionally or alternatively, resource service 304 may interact with external platform(s) to transfer resources to, from, or between external platforms. In some embodiments, when a resource is exchanged for base unit(s), the resource can only be withdrawn from automated intermediary platform 120 by the user that provided the resource when the base unit(s) is recorded in the profile of the user.

In some embodiments, when a resource is exchanged for complete unit(s), the resource can be withdrawn from automated intermediary platform 120 by any user with the complete unit(s) recorded in the profile of that user. The ability to withdraw the resource can travel with the complete unit(s) (e.g., to the resource pool or other users).

Automated intermediary platform 120 can be configured to transfer additional resources to or from a profile of user 301 using resource service 304. For example, user 301 can provide resources using resource service 304 to automated intermediary platform 120. Automated intermediary platform 120 can provide these resources to another user (e.g., when user 301 is an active user that bundled units representing resources, the units obtained from a passive user, automated intermediary platform 120 can provide additional resources associated with the bundled units to the passive user). As an additional example, based on resources associated with user 301 (e.g., in bundling database 312), automated intermediary platform 120 can provide additional resources received from another user using resource service 304. In some embodiments, user 301 may be unable to claim or receive such additional resources until they are provided to automated intermediary platform 120. In some embodiments, automated intermediary platform 120 can provide units (e.g., base units, or the like) corresponding to the additional resources. In such embodiments, the additional resources may remain with an external platform until or unless they are withdrawn by a user). As may be appreciated, in some embodiments, automated intermediary platform 120 can be configured to provide additional resources to a user by interacting with an external system (e.g., to provide, or cause another system to provide, the resources to the external system).

In some embodiments, such as when a user provided a quantity of a resource to create base units representing the resource, resource service 304 may provide additional resources to the user as those additional resources become available, as described herein. Resource service 304 can provide these additional resources, even when the base units are in a resource pool or recorded in the profile of another user.

In some embodiments, such as for resources provide to create complete unit(s), resource service 304 may provide additional resources to the user holding the complete unit(s), or distribute the additional resources among resource contributors to a resource pool including the complete unit(s) (e.g., in accordance with the portions of the pool contributed by the resource contributors). In some embodiments, resource service 304 may create or update records in resource database 305 recording each transfer of additional resources associated with user 301. In some embodiments, resource service 304 can transfer unit(s) representing the additional resources.

In some embodiments, when an active user bundles complete units obtained from user 301 (e.g., user 301 is acting as a passive user with respect to the complete units), automated intermediary platform 120 can force the active user to provide the additional resources associated with the complete units as the conditions on the additional resource components of the resources represented by the complete units are satisfied.

Automated intermediary platform 120 can include pool service 306 for handling resource pool balances. In some embodiments, pool service 306 may create at least one resource pool including at least two different resources (e.g., compute and memory, bandwidth and network connections, E2 instances and H-series virtual machines, any combination of the foregoing, or the like). In some embodiments, pool service 306 can create unit(s) (e.g., base, partially complete, or complete units) for each of the resource types in the pool. In some embodiments, the quantity of units for each resource type can be selected to establish a predetermined an exchange ratio (e.g., according to an invariant function as defined herein). As described herein, resource contributors can provide the resources included in the pool. In return, proportions of the resource pool can be recorded in the profiles of the resource contributors. These proportions can be dependent on the quantity of units contributed to the pool, as described herein.

In some embodiments, pool service 306 can create resource pools between base units, partially complete units, or complete units representing two different resources. In some embodiments, pool service 306 can create resource pools between a base unit and a partially complete unit, a base unit and a complete unit, or a partially complete unit and a complete unit. These differing units can represent the same or differing resources.

In some embodiments, a resource type may not include additional components. In some instances, a resource pool may include units representing a quantity of such a resource (effectively base units) and partially complete or complete units of another resource. In such instances, automated intermediary platform 120 can use the base exchange ratio for the other resource and can manage available additional resources components separately (e.g., representing these additional resource components using separate, independently managed units).

In some embodiments, pool service 306 may receive resource contributions from user 301. The resource contribution can include quantities of units representing both resources in the resource pool. Automated intermediary platform 120 can adjust a profile of user 301 to record a corresponding decrease in unit quantities and increase in a portion of the resource pool associated with user 301. The size of the portion can be determined as described herein. In some embodiments, pool service 306 may receive indication of a withdrawal of units representing both resources by user 301 from the resource pool. The withdrawal can be of a fraction of the pool less than the portion of the pool associated with the user 301 (e.g., a fraction of the units for each of the resources in the pool). Automated intermediary platform 120 can adjust a profile of user 301 to record a corresponding increase in unit quantities and decrease in the portion of the resource pool associated with user 301. Pool service 306 may create or update records in pool database 307 based on each contribution or withdrawal of units representing both resources. In some embodiments, the records can specify quantities of units representing both resources in the resource pool, the invariant function(s) for determining exchanges on the resource pool (or constants or parameters thereof). In some embodiments, the records can specify a quantity of time remaining for the resource pool. In some embodiments, the records can specify a tick structure, anchor exchange rate, real quantities of resources per tick, or the like.

Automated intermediary platform 120 can include exchange service 308 for performing exchanges. In some embodiments, exchange service 308 may exchange units with resource pools, causing the balance of resources represented in the pools to change. Unlike resource contributions, such exchanges may not affect the portions of the pools associated with the contributors of resources to the pools. For example, when a resource pool is created, automated intermediary platform 120 can determine portions for each resource contributor (e.g., 10%, 30%, 50%, 1%, etc.). These portions can be updated as units representing resources are contributed or withdrawn from the pool. A withdrawn can be of a portion of the units in the pool. For example, when 10% is withdrawn from a pool include 100 units of resource A and 90 units of resource B, the withdrawal can be 10 units of resource A and 9 units of resource B. Exchange service 308 may create or update records in exchange database 309 based on each exchange.

Automated intermediary platform 120 can enable user 301 to create one or more requests using request service 313. Request service 313 may allow users to cancel or remove requests from request database 314. In some embodiments, such as when a request created by request service 313 matches another request or matches a resource pool (e.g., managed by pool service 306) that can satisfy the request, exchange service 308 may exchange units representing resources as specified in the request. Additionally or alternatively, when a request fails, automated intermediary platform 120 may update the request database based on this failure (e.g., by deleting the request or adding an indication that the request failed).

In some embodiments, when user 301 is acting as a passive user, automated intermediary platform 120 may allow user 301 to manage resource bundling using bundling service 311. In some embodiments, user 301 can interact with bundling service 311 to provide units representing resources for bundling by another, active user. As part of providing units for bundling, bundling service 311 can update a profile of user 301 to indicate that the units have been provided for bundling. Additionally or alternatively, bundling service 311 can update the profile to indicate that user 301 can no longer exchange these units directly. In some embodiments, bundle database 312 can track units representing resources held by automated intermediary platform 120 as well as some general information. For example, bundle database 312 can track units not associated with any user, and may track the units bundled (e.g., by active users) and the units provided for bundling (e.g., by passive users) across all users. In some embodiments, bundling service 311 may perform a bundling withdraw, updating a profile of a user to indicate that the user has withdrawn an unbundled quantity of resources, such that these resources are available for use by the user, but no longer available for bundling by another, active user.

In some embodiments, when user 301 is acting as an active user, automated intermediary platform 120 may allow user 301 to manage associations between units representing resources provided by user 301 (units of user 301) and units bundled by user 301 using bundling service 311 (units bundled by user 301). For example, bundling service 311 can allow user 301 to associate units of user 301 with units bundled by user 301. As an additional example, bundling service 311 can allow users to de-associate units of user 301 with units bundled by user 301 (e.g., potentially subject to conditions or limitations imposed by automated intermediary platform 120).

In some embodiments, when user 301 is acting as an active user, automated intermediary platform 120 may allow user 301 to bundle units representing resources provided by another, passive user. As part of bundling such units, bundling service 311 can update a profile of user 301 to indicate that the units have been received. Additionally or alternatively, bundling service 311 can update the profile to indicate that user 301 can now exchange these units. Additionally or alternatively, bundling service 311 can update a profile of the other, passive user, to indicate that these units are no longer available for bundling.

In some embodiments, when user 301 is acting as an active user, automated intermediary platform 120 may allow user 301 to return units representing resources to another, passive user. Bundling service 311 can update a profile of user 301 to indicate that the units have been returned. Additionally or alternatively, bundling service 311 can update the profile to indicate that user 301 can no longer exchange these units. Additionally or alternatively, bundling service 311 can update a profile of the other, passive user, to indicate that these units are again available for bundling.

In some embodiments, when user 301 is acting as an active user, automated intermediary platform 120 may allow user 301 to bundle and exchange units representing resources (e.g., potentially subject to conditions or limitations imposed by automated intermediary platform 120). As part of bundling and exchanging such units, bundling service 311 can update profile(s) of user(s) to indicate that the original units are no longer available for bundling and that the original units have been exchanged for new units. Additionally or alternatively, bundling service 311 can update the profile of user 301 to indicate that user 301 can now exchange these new units. In some embodiments, bundling service 311 can perform the bundle and exchange as a single atomic operation (and may record this operation in exchange database 309). In some embodiments, bundling service 311 can perform the bundle and exchange as two separate operations (e.g., a bundle operation and an exchange operation) (and may record these two operations separately in exchange database 309). Bundling service 311 may create or update records in bundling database 312 based on these operations.

In some embodiments, automated intermediary platform 120 can be configured to use different services to handle a request based on whether the request involves bundling. For example, automated intermediary platform 120 may receive a request from user 301 to exchange base element A and for base element B. When automated intermediary platform 120 determines that the request involves bundling (e.g., Yes at 310), bundling service 311 may handle a bundling portion of the received request and request service 313 may handle an exchange portion of the received request. When automated intermediary platform 120 determines that the request does not involve bundling (e.g., No at 310), request service 313 may handle the received request without involvement of bundling service 311.

While the disclosed embodiments are described with reference to cloud computing resources, communication network resources, and virtual machines, the disclosed embodiments are not so limited. In some embodiments, the resources can further include video game compute resources (e.g., access to a physics thread CPU, simulation engine, collision detection engine, or the like), generalize compute resources (e.g., access to serverless compute units, database storage units, network appliances, identity and security authentication appliances, edge and IoT compute units, or the like; session tokens; data delivery content; compute marketplace units; API call units; bandwidth; or the like). In some embodiments, the resources can be or include financial instruments (e.g., equity-based, debt-based, derivatives, options, or the like), digital assets or digital representations of physical assets (e.g., stablecoins, cryptocurrencies, fiat currencies, non-fungible tokens, tokenized securities or commodities or other assets, or the like), or the like. In such embodiments, a base component of the resource can correspond to a principal quantity of the resource, while an additional resource component can be a coupon or interest payment on the base quantity. Conditions on the availability of the additional resources associated with the additional resource component can be time-based, e.g., annual, semi-annual, or the like. Additional resources can be due to the user that provided the original resource to the automated intermediary system (e.g., when the user obtains a base element from the automated intermediary system) or to the user having the element recorded in their user profile (e.g., when the user obtains a partially complete or complete element from the automated intermediary system). In some embodiments, a passive user can lend unit(s) representing resources to the active user. The passive user may provide a quantity of a resources and obtain base unit(s) representing those resources. Also associated with the provided resources can be additional resource components. The active user may borrow the base unit(s), increasing a leverage quantity of the active user. The active user may then be obligated to provide the additional resources to the passive user, as these additional resources become available. In some embodiments, the resources can further include encryption tools (e.g., access to cryptographic compute units, INTEL SGX charges, performance units for encryption, advanced cryptographic units, identity and certificate units, or the like). In some embodiments, the resources can further include signal capture and preprocessing tools (e.g., access to sensor data processing units, audio spectrogram generation units, or the like; tokens representing noise reduction compute time, deep learning GPU hours, natural language generation tokens, or the like; or other suitable signal capture and preprocessing resources). In some embodiments, the resources can further include graphics process resources (e.g., access to resolution-based encoding units, graphics and rendering compute units, video transcoding compute units, or the like; tokens representing encoding minutes, GB of video transcoded, render node-hours, or the like; or other suitable graphics process resources). In some embodiments, the resources can further include artificial intelligence (AI) tools (e.g., access to AI compute resources, vCPU-hours, GPU-hours, TPU-hours, memory GB-hours, storage for machine learning artifacts, AI and machine learning specific atomic resource units, training data units, training units, inference units, model evaluation units, fine-tuning units, inference serving units, optimization units, monitoring and maintenance units, AI and machine learning models, token embedding models, or the like).). In some embodiments, the resources can further include blockchain resources (e.g., hash power, gas units, or the like). In some embodiments, the resources can be or include infrastructure resources. For example, in a smart grid implementation, electrical power producers can exchange electrical power on linked electrical grids using an automated intermediary system consistent with disclosed embodiments. For example, electrical power producers can exchange units representing quantities of electrical power provided (e.g., during a particular time interval, on a particular power grid, using a particular generation method, or the like). As may be appreciated, systems consistent with disclosed embodiments can enable smaller, non-utility scale producers (e.g., individual homes or businesses with electrical panels, dispatchable electrical storage, or the like) to contribute to the stability and efficiency of the electrical grid by exchanging unneeded electrical productive capacity (e.g., X megawatts now for Y megawatts later, or on another grid, or using another electrical generation method, or the like).

In some embodiments, automated intermediary platform 120 can serve as an intermediary between the contributors or users that provide the additional resources and the recipient of the additional resources (which may be, as in this example, a system external to the automated intermediary platform 120). Automated intermediary platform 120 can provide additional resources in place of a user. If necessary, automated intermediary platform 120 can force an exchange of units representing resources (e.g., from a profile of the user to the request database, a resource pool, another user profile, or the like) to ensure the necessary resources are provided. In this manner, automated intermediary platform 120 can ensure that the additional resources are provided.

Example Bundling Scenario

User X may provide an E2 instance resource (e.g., discretized access to the E2 instance can be units of resource A) onto automated intermediary platform 120. Once provided, control over the E2 instance can be transferred to automated intermediary platform 120 or a third-party custodian, and automated intermediary platform 120 may issue units of resource A for exchange or bundling. Automated intermediary platform 120 can represent access to the E2 instance in terms of a base component and additional resources components, as described herein. In this example, the additional resources components can be account fees or the like associated with the E2 instance. These additional resources may be received by another party (e.g., the E2 platform provider or the cloud computing account holder) as they become available. In some instances, User X can create a complete unit representing both the base component and additional resources components. In some instances, User X can create a base unit representing only the base component.

User Y may bundle units of resource A, taking on responsibility for the additional resource components. Automated intermediary platform 120 can determine whether to allow user Y to bundle the units of resource A based on a user profile of User Y (e.g., whether units representing sufficient resources are recorded in the user profile of User Y). User Y may exchange unit(s) of resource A for unit(s) of resource B (e.g., units representing access to H-series virtual machines). In some instances, the exchange can be performed using a resource pool that includes units of resource A and units of B. In some embodiments, the quantities exchanged can depend on an invariant function, as described herein. Bundled unit(s) of resource A may end up in the resource pool or recorded in a user profile of User Z. At some future point, User Y may return the unit(s) of resource A to User X. In some embodiments, automated intermediary platform 120 may block User Y from withdrawing the unit(s) of resource B (e.g., accessing or using these H-series virtual machines) unless it receives indication that User Y has returned the unit(s) of resource A to User X.

Bundling service 311 can ensure that any additional resources associated with the unit(s) of resource A are appropriately transferred as they become available. In this example, when each account payment is due, bundling service 311 may ensure that corresponding additional resources are transferred from the contributors to the resource pool (when the unit(s) of resource A are in the resource pool) or from User Z (when the unit(s) of resource A are recorded in the user profile of User Z). Should there be a chain of unit exchanges, then automated intermediary platform 120 can engage in a chain of additional resource transfers, until the ultimate recipient is reached. An exchange can swap links in this chain. In this example, assuming that User Y exchanges with User Z the unit(s) of resource A for units of resource B, automated intermediary platform 120 can transfer the additional resources from User X to User Y. Automated intermediary platform 120 also transfer the additional resources from User Z to the appropriate third-party system. Should there be any other additional resources associated with the unit(s) of resource B, automated intermediary platform 120 can transfer these other additional resources from User Y to the suitable recipient.

In some embodiments, when User Y exchanges unit(s) of resource A with a User Z, who subsequently withdraws the unit(s) of resource A, automated intermediary platform 120 can continue to transfer the additional resources from User Z to the appropriate third-party system. Automated intermediary platform 120 can continue to transfer the additional resources from User X to User Y. Should there be any other additional resources associated with the unit(s) of resource B, automated intermediary platform 120 can transfer these other additional resources from User Y to the suitable recipient.

As may be appreciated, in some instances the additional resources may be received (rather than provided) by the user that provided the resource to automated intermediary platform 120. In such cases, the direction of transfer of the additional resources in the above examples can be reversed. For example, User X obtains units of resource A. User Y bundles the units of resource A. User Z obtains units of resource B. User Y exchanges the units of resource A for the units of resource B. In such circumstances, User X can receive additional resources from User Y for the units of resource A. User Y can receive additional resources for the units of resource B. User Z can receive additional resources for the units of resource A.

Figure 4:
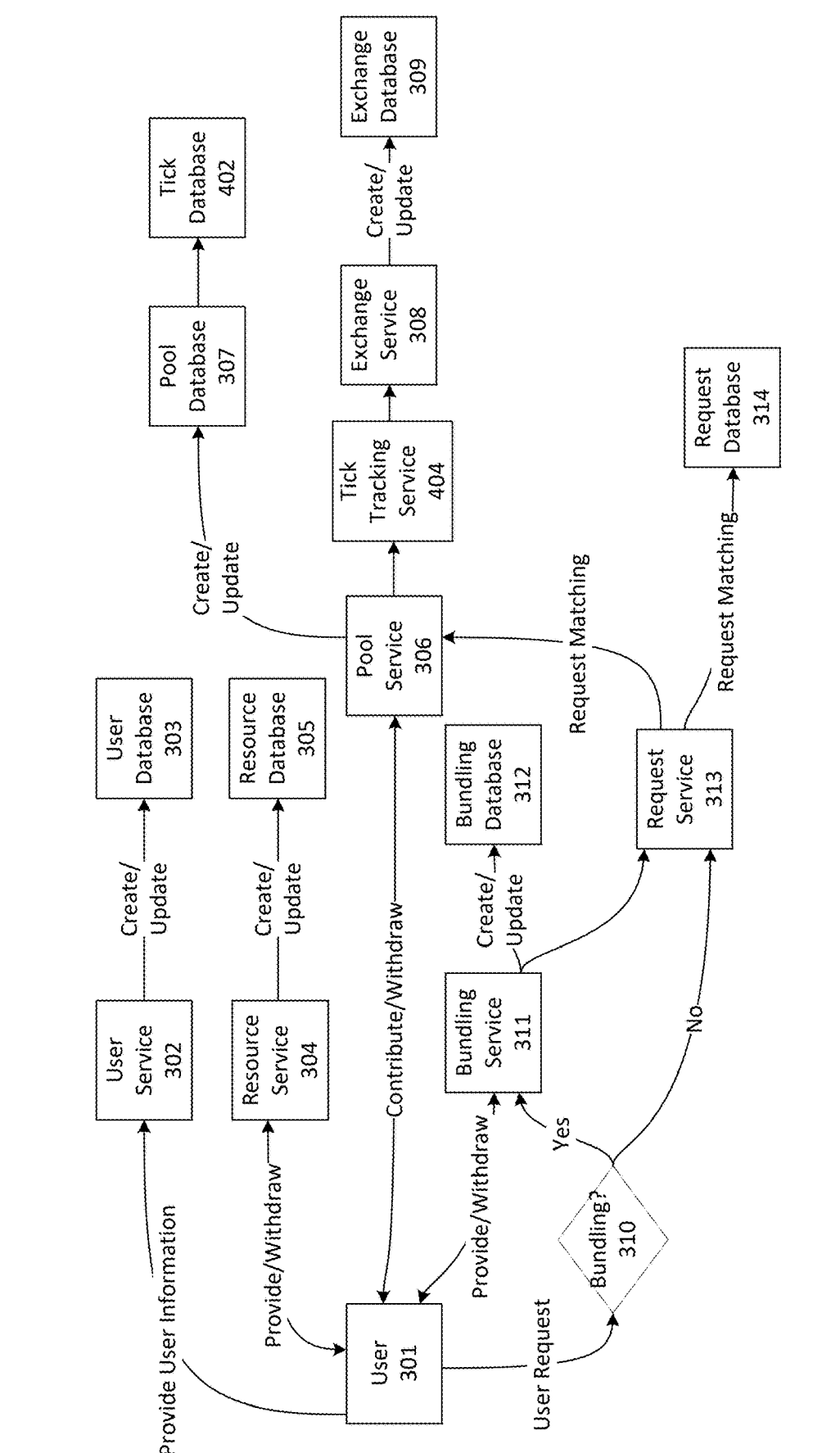
FIG. 4 is an exemplary flow diagram depicted steps concerning an automated intermediary platform, consistent with the disclosed embodiments.

FIG. 4 is an exemplary flow diagram depicted steps concerning automated intermediary platform 120 (e.g., of FIG. 1 or 2), consistent with the disclosed embodiments. Flow diagram 400 depicts, in addition to the elements of flow diagram 300 (of FIG. 3) a resource-providing interface, tick database 402 and tick tracking service 404. An embodiment consistent with flow diagram 400 can support concentration of resource contributions by enabling resource contributors to allocate units representing resources within specific exchange ratio ranges (e.g., ticks). Databases referenced in FIG. 4 can be implemented as separate or combined databases. Such databases can be implemented using suitable data repositor(ies) and a suitable processing architecture, as described herein.

In some embodiments, user 301 (e.g., a resource contributor) may use a user device (e.g., user system(s) 110 of FIG. 1 or 2) to access a resource-providing interface of an automated intermediary platform 120 to contribute resources into designated ticks. Tick database 402 may manage and update parameters of all ticks (exchange ratio ranges) in a resource pool. For example, tick database 402 may track each tick's exchange rate boundaries, a quantity of units representing resources provided, and virtual quantity of such units provided. In some embodiments, automated intermediary platform 120 may update tick database 402 at any moment. For example, automated intermediary platform 120 may update tick database 402 to dynamically adjust tick ranges based on user requests, resource contributions or withdrawals, or updates to historically determined anchor exchange ratios. This flexibility may ensure that a resource pool can adapt to rapidly changing environments while maintaining suitable resource quantities across exchange rate ranges.

Tick tracking service 404 may track and manage a current tick (e.g., exchange rate range) based on a current exchange rate of a resource pool. For example, as user requests are matched, the current exchange rate may shift within a tick structure of the resource pool, and tick tracking service 404 may continuously update the current tick where user requests are matching. Every exchange may affect the current exchange rate and tick tracking service 404 may frequently update the current tick and ensure that user requests are matched within the correct tick. Tick tracking service 404 may update to a new tick when the units contributed to the current tick are depleted or when the current exchange rate moves outside of the exchange rate range boundaries of the current tick.

Tick database 402 and tick tracking service 404 may ensure that the tick-based structure operates smoothly, enabling real-time adjustments as user requests are matched.

Figure 5:
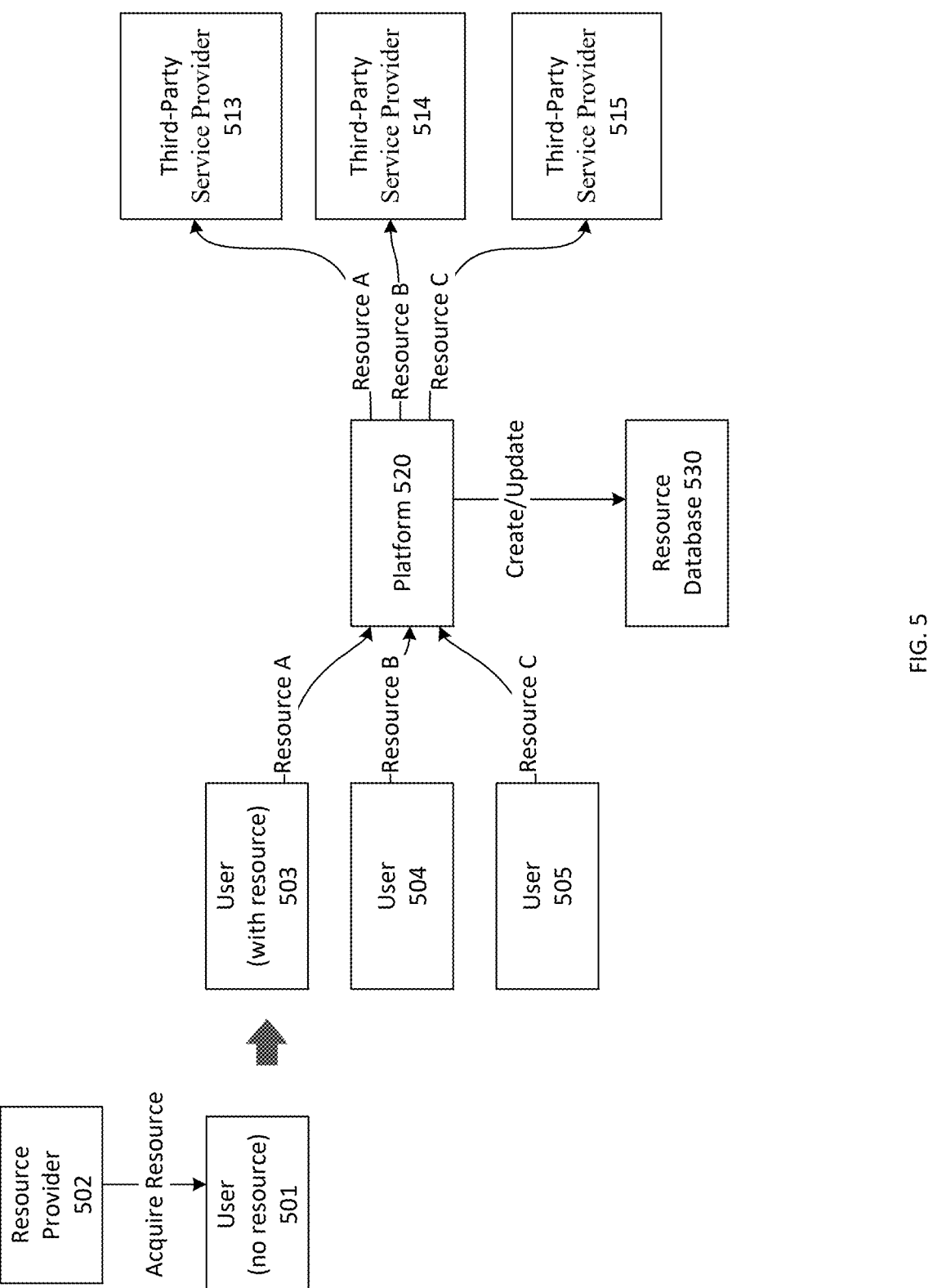
FIG. 5 is an exemplary flow diagram depicted steps concerning an automated intermediary platform, consistent with the disclosed embodiments.

FIG. 5 is an exemplary flow diagram 500 depicted steps concerning an automated intermediary platform 520 (e.g., automated intermediary platform 120 of FIG. 1 or 2), consistent with the disclosed embodiments. As shown in FIG. 5, a user without a resource 501 may acquire a resource from a resource provider 502 (e.g., a cloud computing platform, communications network provider, or another suitable provider of resources as described herein). Once the user has acquired a resource (e.g., user 503), the user may provide the resource (e.g., Resource A) to platform 520. In some embodiments, platform 520 can be configured to cause control or management of the resource to be transferred to a third-party service provider 513. For example, platform 520 can temporarily manage or control the resource using a system associated with platform 520, then transfer the resource to the third-party service provider 513. As an additional example, platform 520 can provide instructions to user 503 to transfer the resource to the third-party service provider 513. Platform 520 can receive confirmation from user 503 or the third-party service provider 513 that the resource has been transferred. As may be appreciated, different users (e.g., users 504, 505) can provide different resources (e.g., Resource B, Resource C). Platform 520 can be configured to cause control or management of these different resource to be transferred to different third-party service provider (e.g., third-party service provider 514, 515). Platform 520 may record units (e.g., base, partially complete, complete units) representing the resources provided by each user (e.g., users 503, 504, 505) under respective user profiles in resource database 530.

In some embodiments, platform 520 may allow a user to contribute units recorded in a profile of the user to resource pools, thereby serving as a resource contributor. In some embodiments, platform 520 may allow a user to provide units for bundling, thereby serving as a passive user (and potentially enabling the user to receive additional resources associated with the resources while other active users are able to use the resources associated with the units, or exchange the units). In some embodiments, platform 520 may allow a user to exchange units representing resources with other users.

In some embodiments, platform 520 may restrict such exchanges to units representing resources of a common type. For example, platform 520 can restrict units representing bandwidth on a communications network to exchanges involving units representing bandwidth on other communications networks. Similarly, platform 520 can restrict units representing one type of virtual machines to exchanges involving units representing other types of virtual machines. In some embodiments, platform 520 may permit exchanges across resource types. For example, units representing bandwidth can be exchanged for units representing virtual machines. In some embodiments, platform 520 may permit units representing one resource type to exchange only with units representing another resource type (e.g., memory for compute), but allow units representing that resource type to exchange with units representing multiple resource types (e.g., compute for memory, compute for bandwidth, compute for virtual machines, etc.).

Consistent with disclosed embodiments, platform 520 can enable a user (e.g., one of users 503, 504, 505) to create user requests. Platform 520 can implement a request service (e.g., request service 313 of FIG. 3) service to match these requests against other user requests or resource pools, as described herein. The request service can implement a coordination logic, as described herein. In some embodiments, when the user request is fully or partly fulfilled, platform 520 may send information associated with the request to an exchange service (e.g., exchange service 308 of FIG. 3) which may record the information in an exchange database (e.g., exchange database 309 of FIG. 3). In some embodiments, platform 520 may send any unfilled parts of the user request to the request service again, which may make a record in a request database (e.g., request database 314 of FIG. 3), waiting for a next available match. Platform 520 may record in a profile of the user a resource quantity (e.g., a quantity of base, partially complete, or complete units, depending on the user request) for the fulfilled portion of the user request. The exchange and request databases referenced can be implemented as separate or combined databases. Such databases can be implemented using suitable data repositor(ies) and a suitable processing architecture, as described herein.

Figure 6:
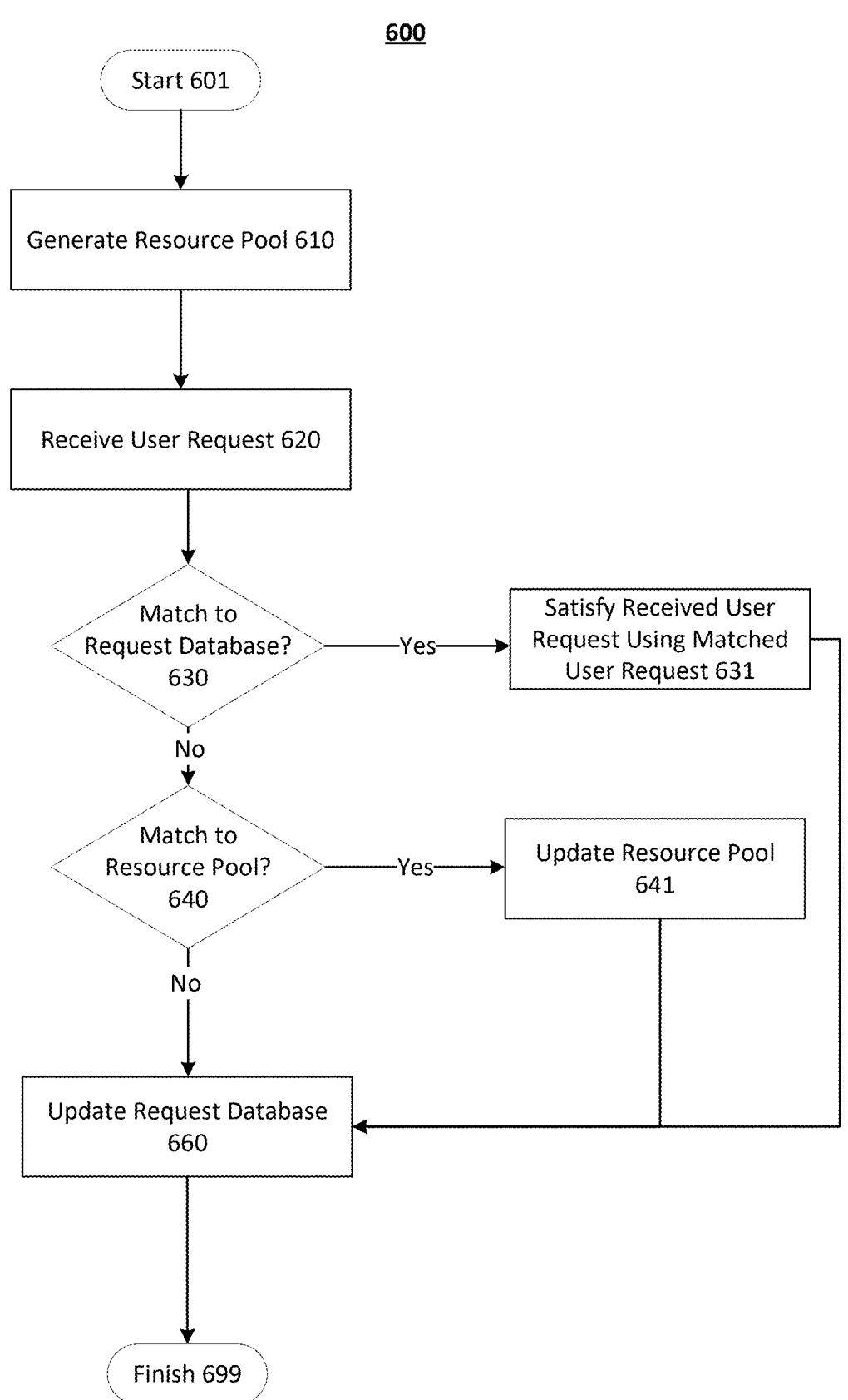
FIG. 6 depicts an exemplary process for exchanging resources using an automated intermediary platform including a request database and a resource pool, consistent with disclosed embodiments.

FIG. 6 depicts an exemplary process 600 for exchanging resources using an automated intermediary platform including a request database and a resource pool, consistent with disclosed embodiments. Process 600 can be performed between a user system (e.g., one of user systems 110, or the like) and an automated intermediary platform (e.g., automated intermediary platform 120, or the like) as shown and described with respect to FIG. 1, or another suitable system. In some embodiments, a managerial or custodial system (e.g., managerial or custodial system 130, or third-party service provider 513, 514, 515 or the like) can control, store, or manage resources provided to the automated intermediary platform. Consistent with disclosed embodiments, the automated intermediary platform can be implemented as shown and described in FIG. 2, or another suitable system. In some embodiments, the automated intermediary system can be configured to implement services as described in FIGS. 3 and/or 4 using components as described in in FIG. 2. Databases referenced in FIG. 6 can be implemented as separate or combined databases. Such databases can be implemented using suitable data repositor(ies) and a suitable processing architecture, as described herein.

Process 600 can begin in step 601. User(s) may have provided resources to the automated intermediary system, as described herein with respect to FIGS. 1 to 5. The automated intermediary system can record units representing the provided resources in user profile(s) of the user(s), consistent with disclosed embodiments. As described herein, such units can be base units, partially complete units, or complete units (e.g., as specified by the user(s) or the automated intermediary system).

In step 610, the automated intermediary system can create a resource pool, consistent with disclosed embodiments. As described herein, the resource pool can correspond to two resources. The resource pool can include units representing these resources. As described herein, users can act as resource contributors, contributing the units to the resource pool. In some embodiments, the automated intermediary system can ensure that the pool is balanced, such that a quantity of units representing one resource in the pool, expressed as a quantity of the units representing the other resource according to an exchange ratio of the pool, equals the quantity of the units representing the other resource in the pool. Given or assuming the exchange ratio for the resource pool, the automated intermediary system can be configured to require that resource contributions to the pool are balanced. In this manner, the automated intermediary system can ensure that the pool is balanced.

Consistent with disclosed embodiments, the automated intermediary system can create a tick structure associated with the resource pool. As described herein, at least with reference to "Concentrated Resource Contribution" and elsewhere in the specification, the automated intermediary system can enable resource contributors to contribute units representing resources to specified ticks or tick ranges within the tick structure associated with the resource pool. In some embodiments, should the resource contributor specify a range of multiple ticks, the contributed units can be divided between the ticks.

In step 620, the automated intermediary system can receive a user request, consistent with disclosed embodiments. The user request can be received from a user system. The request can be received from an application running on the user system (e.g., a component, plug-in, or application layer configured to service resource requests from other application components by performing resource exchanges as described herein, a browser, a special purpose application or "app" for making resource exchanges as described herein, or another suitable application). The automated intermediary system can receive the request through an API endpoint, a web service interface, or another suitable entry point. The automated intermediary system can receive the request from a dedicated terminal or computing system, a network connection dedicated to transmitting such exchange requests, or over a public or private network.

In some embodiments, the user system can be configured to generate the user request automatically. For example, as described herein, the user system can generate the request to exchange resources as needed for the tasks performed by the user system. In some embodiments, the user system can generate the user request in response to instructions provided by the user (e.g., in response to user interactions with a graphical user interface or other user interface provided by the user system).

Consistent with disclosed embodiments, the user request can specify identify a resource to be exchanged and a quantity of the resource to be exchanged (e.g., in terms of a quantity of units of the resource, or another suitable measure). In some embodiments, the user request can specify a resource to return and a quantity of the resource to return. In some embodiments, the user request can specify a particular resource pool for exchanging the resources, or a particular request database for matching the user request. In some embodiments, the user request can specify conditions on matching the request. For example, as described herein, the user request can specify a maximum or minimum exchange ratio for the request.

In steps 630 and 640, the automated intermediary system can be configured to match the user request to a request database or a resource pool. As described herein, at least with respect to "Coordination Process (Concentrated Resource Contribution)" and elsewhere in this specification, the automated intermediary system can execute a coordination logic that depends on the composition of the user request database and whether the user request imposes exchange ratio conditions on the exchange. In the example shown in FIG. 6, the automated system can first attempt to completely match the user request to user requests stored in the request database in step 630. As may be appreciated, the automated intermediary system can match a request to exchange resource A for resource B to a request to exchange resource B for resource A. Should the automated intermediary system be unable to completely match the user request to user request(s) stored in the user request database, the automated intermediary system can attempt to match the user request (or an unsatisfied portion thereof) to the resource pool in step 640. Should the automated intermediary system be unable to completely match the user request (or the unsatisfied portion thereof) to the resource pool, the automated intermediary system can proceed to step 660.

In step 631, the automated intermediary system can at least partially satisfy the received user request using one or more user requests stored in the request database. As described herein, the automated intermediary system can select among stored user requests that match the received user request based on characteristics of the stored user request (e.g. recency, quantity, exchange ratio conditions, or other suitable criteria). Should the automated intermediary system be able to satisfy the received user request using the one or more matched stored user requests, then process 600 can proceed to step 660. Otherwise, process 600 can proceed to step 640 (not shown in FIG. 6) and the automated intermediary system can match the remainder of the user request to the resource pool.

In step 641, the automated intermediary system can at least partially satisfy the received user request using the resource pool. As described herein at least with respect to "Exchange Logic with a Resource Pool", "Single-Tick Exchange", "Cross-tick Exchange", and elsewhere in this specification, the automated intermediary system can determine a quantity of units of one resource returned from the resource pool in exchange for a quantity of units of the other resource provided to the resource pool. In some embodiments, the automated intermediary system can also determine a quantity of units of one or more resources diverted from the exchange. In some embodiments, the automated intermediary system can update the tick structure of the pools, the real quantities of units of each resource contained in each tick or tick range, the current exchange rate of the pool, or the like. The automated intermediary system can then proceed to step 660.

In step 660, the automated intermediary system can update the request database. The updates to the request database can depend on whether the automated intermediary system matched the user request to the user request database or the resource pool. Stored user requests that are completely satisfied can be removed from the user request database. The user request database can be updated to reflect request quantities for stored or received requests that are only partially satisfied. For example, the automated intermediary system can match a stored user request to a request in the request database. But a quantity of units representing a first resource provided in the stored user request may be less than a quantity of units representing a second resource provided in the received resource request, given a current exchange ratio. The current exchange ratio can depend on quantities of units representing the two resources in the resource pool, as described herein. Accordingly, while the received request can satisfy the stored request (and automated intermediary system can accordingly remove the stored request from the request database in step 660), the stored request may be insufficient to satisfy the received request. The automated intermediary system can match the unsatisfied portion of the received request to the resource pool. However, in this example, the resource pool may only be able to absorb some of the unsatisfied portion of the received request. Accordingly, the automated intermediary system can create an entry in the user request database for the remainder of the received request. The automated intermediary system may match this remainder to another, subsequently received, user request.

In step 699, process 600 can terminate. As may be appreciated, steps 620 to 660 may be performed whenever the automated intermediary system receives user requests. Similarly, the automated intermediary system can repeatedly receive resource contributions to, or resource withdrawals from, the resource pool. As described herein, the units exchanged can be base, partially complete, or complete units. The automated intermediary system can also manage any additional resources associated with these units, whether by providing those additional resources to users or third-party systems, as described herein. In some embodiments, the automated intermediary system can determine a quantity of the exchange to divert, as described herein.

Consistent with disclosed embodiments, the automated intermediary system can provide instructions as necessary to managerial or custodial systems to facilitate or effectuate the exchange. As a non-limiting example, the automated intermediary system can provide instructions to a cloud computing account to change access or authentication requirements to effectuate an exchange of one cloud computing resource for another. As another non-limiting example, the automated intermediary system can provide instructions to a network management system to exchange use or control over communication network connections or bandwidth.

Figure 7:
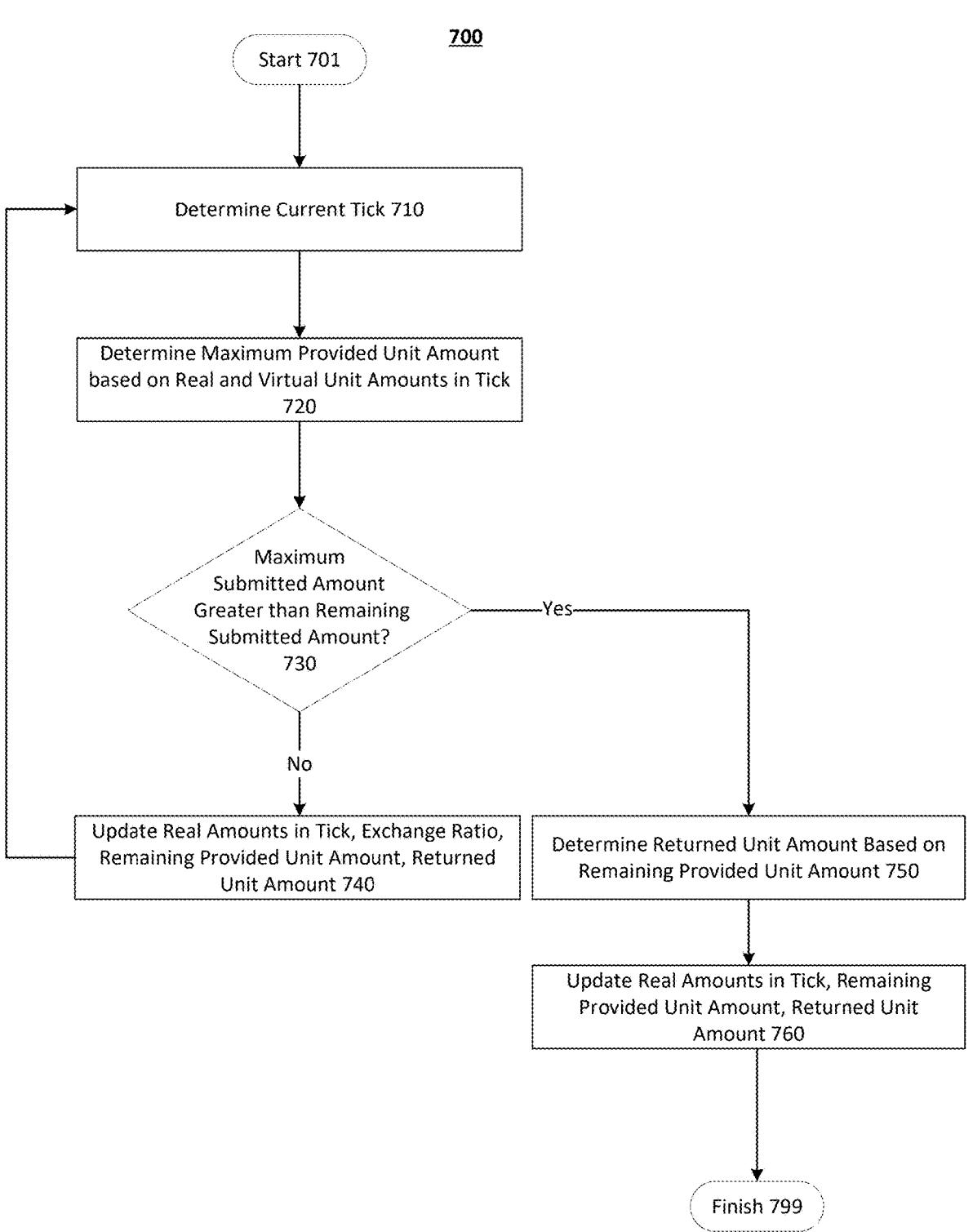
FIG. 7 depicts an exemplary process for exchanging resources with a concentrated resource pool having an associated tick structure, consistent with disclosed embodiments.

FIG. 7 depicts an exemplary process 700 for exchanging resources with a concentrated resource pool having an associated tick structure, consistent with disclosed embodiments. Process 700 can be performed using an automated intermediary platform (e.g., automated intermediary platform 120, or the like) as shown and described with respect to FIG. 1, or another suitable system. Consistent with disclosed embodiments, the automated intermediary platform can be implemented as shown and described in FIG. 2, or another suitable system. In some embodiments, the automated intermediary system can be configured to implement services as described in FIGS. 3 and/or 4 using components as described in in FIG. 2. Databases referenced in FIG. 7 can be implemented as separate or combined databases. Such databases can be implemented using suitable data repositor(ies) and a suitable processing architecture, as described herein.

In step 701, process 700 can start. In some embodiments, process 700 can be performed as part of another process described herein (e.g., in step 641 of process 600, or the like) or as a separate process. In some embodiments, in step 701, automated intermediary system can obtain a quantity of units representing a resource to exchange and a resource pool including the resource.

In some embodiments, the resource pool can be configured to concentrate unit quantities into ticks or tick ranges. The resource pool can include a tick structure that specifies the ticks or tick ranges. The ticks or tick ranges can be specified in terms of exchange ratios (e.g., a pair of contiguous exchange ratios can define a tick) or in terms of an anchor exchange ratio. The anchor exchange ratio can depend on historical exchange ratio data for the resource pool. In some embodiments, the automated intermediary system can obtain a current exchange ratio. In some embodiments, the resource pool can be time-limited. In such embodiments, as described herein, the exchange can be time-dependent. In some such embodiments, automated intermediary system can obtain a time for calculating the exchange. The time can be a time remaining for the resource pool, or another time or temporal indication that the automated intermediary system can use to determine a time remaining for the resource pool. In some embodiments, a returned resource quantity can be initialized to zero.

In step 710 of process 700, the automated intermediary system can determine a current tick in the tick structure based on the current exchange rate obtained in step 701. In some embodiments, the automated intermediary system can obtain the current tick when process 700 starts. In some instances, when the current exchange ratio is a boundary value of a tick, the automated intermediary system can determine the current tick based on the current exchange ratio and a direction of the exchange. For example, when the current exchange ratio specifies a quantity of units representing resource A (e.g., A units) in terms of a quantity of units representing resource B (e.g., B units), an exchange of A units into the resource pool may tend to increase the current exchange ratio, while an exchange of B units into the resource pool may tend to decrease the current exchange ratio. Accordingly, when the current exchange ratio is at a boundary between ticks and the user request specifies exchanging-in A units, the automated intermediary system may select the tick having the current exchange ratio as its lower bound. Conversely, when the user request specifies exchanging in B units, the automated intermediary system may select the tick having the current exchange ratio as its upper bound.

In step 720 of process 700, the automated intermediary system can determine a maximum provided resource quantity based on real and virtual quantities of the A and B units (e.g., as described in "Cross-Tick Exchange" and elsewhere herein). The maximum provided quantity is the quantity of the exchanged-in units than the current tick can absorb. As described herein, this quantity can be determined by forecasting the real quantity of the exchanged-in units when the real quantity of the exchanged-out units in the tick is zero. As described herein, the virtual quantities of the units can depend on the tick boundaries (and optionally on the time remaining for the resource pool).

In some embodiments, the returned-out quantity can be determined according to an invariant function, as described herein. The invariant function can be associated with the resource pool. As may be appreciated, different resource pools can be associated with different invariant functions. In some embodiments, the invariant function can be multiplicative. In some embodiments, the invariant function can be additive. In some embodiments, the invariant function can be time-dependent. In some embodiments, the invariant function can be time-independent. In some embodiments, the automated intermediary system can determine a quantity of the exchange to divert, as described herein.

In step 730 of process 700, the automated intermediary system can determine whether the maximum provided unit quantity is greater than a remaining submitted quantity. In some embodiments, the remaining submitted quantity can be initialized to the quantity of the exchanged-in units specified in the user request. The remaining submitted quantity can then be decremented as described herein. In some embodiments, the remaining submitted quantity can be the quantity of the exchanged-in units specified in the user request, suitably decremented as described herein. When the maximum provided unit quantity is greater than the remaining submitted quantity, process 700 can proceed to step 750. Otherwise, process 700 can proceed to step 740.

In step 740 of process 700, the automated intermediary system can drain the current tick of the exchanged-out units. As described herein, the real quantity of the exchanged-out units can be set to zero. The real quantity of the exchanged-in units can be set to the sum of the existing real quantity of the exchanged-in units and the maximum provided quantity. The returned unit quantity can be incremented by the returned-out quantity. The current exchange ratio can be set to the lower or upper boundary of the tick, depending on the direction of the exchange. The remaining submitted unit quantity can be decremented by the maximum provided quantity. Process 700 can then return to step 710.

As may be appreciated, in some instances, the automated intermediary system can drain all ticks in the tick structure. In some instances, process 700 can proceed to step 799. The automated intermediary system can then record the remaining submitted unit quantity as a user request in the user request database and transfer the returned unit quantity to the requesting user, as described herein.

In step 750 of process 700, the automated intermediary system can determine a returned-out quantity given provision of the remaining submitted quantity (e.g., as described in "Single-Tick Exchange" and elsewhere herein). In some embodiments, the returned-out quantity can be determined according to an invariant function. The invariant function can be the same invariant function as in step 740.

In step 740 of process 700, the automated intermediary system can decrement the real quantity of the exchanged-out units by the returned quantity. The real quantity of the exchanged-in resource can be set to the sum of the existing real quantity of the exchanged-in resource and the remaining submitted quantity. The returned resource quantity can be incremented by the returned-out quantity. The current exchange ratio can be determined based on the ratios of the real and virtual quantities of the resources in the tick.

In step 799, process 700 can terminate. When process 700 is performed as part of another process (e.g., process 600), process 700 can return the accumulated returned unit quantity. The other process can then manage the transfer of the resources (e.g., by providing instructions to managerial or custodial systems). Alternatively, when performed separately, process 700 can manage such transfer. In some embodiments, when a portion of the exchanged resources are diverted, automated intermediary system can accumulate the diverted resources in steps 740 and 750 and transfer the diverted resources in step 799. Furthermore, when the resource pool included complete units, step 799 can include the allocation of available additional resources associated with the exchanged complete units, as described herein.

Exemplary Resource Pool Implementations

In the following examples, unit A represents a base component of resource A and unit B represents a base value of a resource B. Resources A and B may also include additional resource components, which in this example may provide additional resources as a time condition for each resource is satisfied. Resources A and B may both have the same duration. Resources A and B may be paired to create a resource pool of units A and B.

Scenario 1: Time-Dependent Resource Pool without Diversion

Invariant Function:

$$x_{end}^{(1-t)} + y_{end}^{(1-t)} = k_t = x_{start}^{(1-t)} + y_{start}^{(1-t)}$$

where:

| | |
|---|---|
| x | quantity of unit A in resource pool, $x > 0$ |
| y | quantity of unit B in resource pool, $y > 0$ |
| t | Remaining duration of resource A and resource B (if resources A and B have different, but similar remaining durations, use the smaller remaining duration as the duration for the resource pool), t normalized so that $0 \le t < 1$; at expiration $t = 0$ |
| $k_t$ | constant defining relationship between quantities of unit A and unit B in resource pool |
| start; end | status of x and y before and after each exchange |

Exchange ratio of unit B in terms of unit A (withdraw y from the resource pool by putting in x):

$$R_y = (x/y)^t$$

Exchange ratio of unit A in terms of unit B (withdraw x from the resource pool by putting in y):

$$R_x = (y/x)^t$$

At any given time t, in any exchange, change of x ($\Delta x$) and change of y ($\Delta y$) in the resource pool may be:

$$\Delta x = x_{end} - x_{start}$$

$$\Delta y = y_{end} - y_{start}$$

Both $\Delta x$ and $\Delta y$ may be less than 0, which may mean exchanging out the one resource from the resource pool by adding the other resource.

At the beginning of each exchange, automated intermediary platform 120 may know $x_{start}$ and $y_{start}$. For example, they may be known ex-ante (e.g., based on forecasts rather than actual results). In addition, one of $\Delta x$ or $\Delta y$ may be provided in a user request. When diversions to resource contributors are excluded, x and y may be symmetric. For example, automated intermediary platform 120 may assume $\Delta x$ ex-ante and may calculate $\Delta y$ as follows:

$$x_{end} = x_{start} + \Delta x$$

$$y_{end} = \left(k_t - x_{end}^{(1-t)}\right)^{\frac{1}{1-t}}$$

$$\Delta y = y_{end} - y_{start}$$

An implied subsequent exchange rate of exchanging units B from the pool may be:

$$r = \frac{y}{x} - 1$$

Scenario 2: Time-Independent Resource Pool without Diversions
Invariant Function:

$$x_{end} * y_{end} = k = x_{start} * y_{start}$$

where:

| | |
|---|---|
| x | quantity of unit A in resource pool, x > 0 |
| y | quantity of unit B in resource pool, y > 0 |
| end, start | Start and end subscripts indicate that quantities are assessed before and after each exchange. |
| $k_t$ | constant defining relationship between quantities of unit A and unit B in pool |

Exchange ratio of unit A in terms of unit B (withdraw x from the resource pool by putting in y):

$$R_x = \frac{y}{x}$$

Exchange ratio of unit B in terms of unit A (withdraw y from the resource pool by putting in x):

$$R_y = \frac{x}{y}$$

At any given time t, in any exchange, change of x ($\Delta x$) and change of y ($\Delta y$) in the pool may be:

$$\Delta x = x_{end} - x_{start}$$

$$\Delta y = y_{end} - y_{start}$$

Both $\Delta x$ and $\Delta y$ may be less than 0, which may mean exchanging out the one resource from the resource pool by adding the other resource.

At the beginning of each exchange, automated intermediary platform 120 may know $x_{start}$ and $y_{start}$ ex-ante. In addition, one of $\Delta x$ or $\Delta y$ may be provided in a user request. When diversions to resource contributors are excluded, x and y may be symmetric. For example, automated intermediary platform 120 may assume $\Delta x$ ex-ante and may calculate $\Delta y$ as follows:

$$x_{end} = x_{start} + \Delta x$$

$$y_{end} = \frac{k}{x_{end}}$$

$$\Delta y = y_{end} - y_{start}$$

Scenario 3: Time-Dependent Invariant Function when Including Diversions

When diversions are included in an exchange, x and y may not be symmetric. The invariant function may depend on a direction of the exchange. Automated intermediary platform 120 may assume that the exchange ratio of unit A to unit B (e.g., unit A/unit B) would be greater than unity. In the resource pool, automated intermediary platform 120 may assume a quantity of unit A would always be no larger than the quantity of unit B ($x \leq y$).

If a user request specifies exchanging unit A from the pool by providing unit B, the invariant function may be the following:

$$x_{end}^{\left(1-\frac{t}{g}\right)} + y_{end}^{\left(1-\frac{t}{g}\right)} = k_t = x_{start}^{\left(1-\frac{t}{g}\right)} + y_{start}^{\left(1-\frac{t}{g}\right)}$$

If a user request specifies exchanging unit B from the pool by providing unit A, the invariant function may be the following:

$$x_{end}^{(1-gt)} + y_{end}^{(1-gt)} = k_t = x_{start}^{(1-gt)} + y_{start}^{(1-gt)}$$

where:

| | |
|---|---|
| x | quantity of unit A in resource pool, x > 0 |
| y | quantity of unit B in resource pool, y > 0 |
| g | diversion factor of resource pool, g < 1 (e.g., g = 0.98) |
| t | Remaining duration of resource A and resource B (if resources A and B have different, but similar remaining durations, use the smaller remaining duration as the duration for the resource pool), t normalized so that $0 \leq t < 1$; at expiration t = 0 |
| $k_t$ | constant defining relationship between quantities of unit A and unit B in resource pool |

An implied diversion rate when exchanging units B from the pool may be:

$$r = \left(\frac{y}{x}\right)^g - 1$$

Scenario 4: Time-Independent Invariant Function when Including Diversion

When diversions are included in an exchange, x and y may not be symmetric. The invariant function may depend on a direction of the exchange. If a user request specifies exchanging unit B from the pool by providing unit A ($\Delta x$ is known ex-ante), then the invariant function may be the following:

$$(x_{start}+r\Delta x)(y_{start}+\Delta y)=k=x_{start}*y_{start}$$

where r=1−diversion rate.

If a user request specifies exchanging unit A from the pool by providing unit B ($\Delta y$ is known ex-ante), then the invariant function may be the following:

$$(x_{start}+\Delta x)(y_{start}+r\Delta y)=k=x_{start}*y_{start}$$

Assume that $\Delta x$ is known ex-ante. Then the quantity of $\Delta y$ can be calculated as follows:

$$\Delta y = -\frac{y_{start}r\Delta x}{x_{start}+r\Delta x}$$

Otherwise, when $\Delta y$ is known, the quantity of $\Delta x$ can be calculated as follows:

$$\Delta x = \frac{x_{start}\Delta y}{r(y_{start}+\Delta y)}$$

Automated intermediary platform 120 can be configured to use the $\Delta x$ formula to determine the quantity $\Delta x$ when a known quantity of y is to be withdrawn. Automated intermediary platform 120 can be configured to use the $\Delta y$ formula to determine $\Delta y$ when a known quantity of x is to be withdrawn.

Scenario 5: Resources are Contributed to the Resource Pool

Automated intermediary platform 120 can be configured to create a resource pool using resources provided by resource contributors. The resources contributors can provide quantities of both units representing resource A (e.g., unit A) and units representing resource B (e.g., unit B). In some instances, for base or partially complete unit, the quantities of unit A and unit B can be selected based on the current exchange ratio (base or partially complete ratio, respectively) of the units. For example, in some embodiments, the quantity of unit A times the current exchange ratio of unit B in terms of unit A can equal the quantity of unit B. In some instances, for complete units, automated intermediary platform 120 can use the base or partially complete ratio to determine the quantities of unit B and unit A. Automated intermediary platform 120 can separately manage the additional resource components of resources A and B. Assuming an exchange ratio B/A of x, and that each resource contributor i contributed $\alpha_i$ quantity of unit A and $b_i x$ unit of unit B, the value of the resource pool (in terms of the equivalent quantity of unit A) at initiation may be represented by $S_0=\Sigma(\alpha_i+b_i x)$, and each resource contributor's portion of resource pool at initiation may be represented by $w_i=(\alpha_i+b_i x)/S_0$.

At each given time t, existing and new resource contributors may contribute to the resource pool by contributing both unit B and unit A in proportion to the current ratio of unit B and unit A in the resource pool. Automated intermediary platform 120 can be configured to assume that at time t, before any new resources are added to the pool, each existing resource contributor i's share of the pool is $w_{it}$ and a value of the pool is $S_t$. At time t+1, Automated intermediary platform 120 may have added all resource contributions to the pool and, assuming each resource contributor (including existing resource contributors and new resource contributors) contributes unit A and unit B with a value (in terms of the equivalent number of units A) of $S_{i(t+1)}$, a new value of the whole resource pool at time t+1 may be represented by:

$$S_{t+1}=S_t+\Sigma(s_{i(t+1)}),$$

and each resource contributor's portion of the resource pool at t+1 may be represented by:

$$w_{i(t+1)}=(w_{it}\times S_t+s_{i(t+1)})/S_{t+1}$$

Automated intermediary platform 120 may assume that for each new resource contributor at time t+1, their portion of the pool at time t: $w_{it}=0$.

At each given time t, each existing resource contributor may withdraw their portion from the pool by taking out both unit A and unit B in proportion to the current ratio of unit B and unit A in the resource pool. Automated intermediary platform 120 may assume that at time t, before any withdrawal occurs, each existing resource contributor i's portion of the pool is $w_{it}$ and a value of the pool is $S_t$. At time t+1, automated intermediary platform 120 may have removed all withdrawals from the pool and, assuming each resource contributor withdraws unit A and unit B with value (in terms of the equivalent number of units A) $d_{i(t+1)}$. Since a resource contributor's withdrawals must be less than their total portion of the resource pool, $$d_{i(t+1)}\leq w_{it}S_t.$$

The value of the resource pool at time t+1 may be represented by:

$$S_{t+1}=S_t-\Sigma(d_{i(t+1)})$$

and each resource provider's share of the resource pool at t+1 may be represented by:

$$w_{i(t+1)}=(w_{it}\times S_t-d_{i(t+1)})/S_{t+1}$$

For each time t, both provisions and withdrawals may happen simultaneously and may have the same priority. In some embodiments, automated intermediary platform 120 may process provisions and then move to withdrawals.

In some embodiments, the automated intermediary platform 120 can be configured to separately consider base and additional resource components of a resource. For example, automated intermediary platform 120 may generate base units representing only the base component of a resource. Additionally or alternatively, automated intermediary platform 120 may receive base units from resource contributors for adding to a resource pool. By excluding additional resource components from the units representing the resource, automated intermediary platform 120 may reduce contribution loss of the resource providers and ensure that additional resource distributions remain unaffected by exchange ratio changes within resource pools.

In some embodiments, automated intermediary platform 120 may combine base and additional resource components. For example, a resource pool can include complete units as described herein. For complete units, automated intermediary platform 120 may consider available and unavailable additional resource components in determining the complete ratio.

Scenario 6: Exchange without Diversion

In this example, a resource pool may include 1,000,000 units representing resource B (unit B) and 500,000 units representing resource A (unit A). An initial time factor t at inception may be 1.

At time t=0.9, a user request can match to the pool. Automated intermediary platform 120 can be configured to execute the following function to exchange units A for units B, or units B for units A:

$$k_t = x_{start}^{(1-t)} + y_{start}^{(1-t)} = 7.6955 = x_{end}^{(1-t)} + y_{end}^{(1-t)}$$

Providing 1 unit A into the resource pool ($\Delta x=1$) in exchange for unit(s) B:

$$x_{end} = x_{start} + \Delta x = 500,001$$

$$y_{end} = (k_t - x_{end}^{(1-t)})^{\frac{1}{1-t}} = 999,998.13$$

$$\Delta y = y_{end} - y_{start} = -1.87$$

This exchange yields 1.87 units B, equating to an exchange ratio of 1.87 units B per unit A.

Providing 1 unit B into the resource pool ($\Delta y=1$) in exchange for unit(s) A:

$$y_{end} = y_{start} + \Delta y = 1,000,001$$

$$x_{end} = (k_t - y_{end})^{\frac{1}{1-t}} = 499,999.46$$

$$\Delta x = x_{end} - x_{start} = -0.54$$

This exchange yields 0.54 units A, equating to an exchange ratio of 0.54 units A per unit B. For a complete unit, automated intermediary platform 120 can be configured to determine an exchange of available additional resources, as described herein.

Scenario 7: Exchange with Diversion

In this example, a resource pool may include 1,000,000 units representing resource B (unit B) and 500,000 units representing resource A (unit A). An initial time factor t at inception may be 1. Automated intermediary platform 120 can be configured to execute a function that includes a diversion factor g (e.g., the lower g is, the greater the diversion). This example assumes a diversion factor g=0.98, all other parameters may remain constant, and at time t=0.9, a user request can match to the pool.

Providing 1 unit A into the resource pool ($\Delta x=1$) in exchange for unit(s) B:

$$\tilde{k}_t = x_{start}^{(1-tg)} + y_{start}^{(1-tg)} = 9.81 = \widetilde{x_{end}}^{1-tg} + \widetilde{y_{end}}^{1-tg}$$

$$\widetilde{x_{end}} = x_{start} + \Delta_x = 500,001$$

$$\widetilde{y_{end}} = (\tilde{k}_t -)^{\frac{1}{1-tg}} = 999,998.16$$

$$\widetilde{\Delta y} = \widetilde{y_{end}} - y_{start} = -1.84$$

where:

| | |
|---|---|
| $\widetilde{x_{end}}$ | quantity of unit A in resource pool after exchange with diversion is complete |
| $\widetilde{y_{end}}$ | quantity of unit B in resource pool after exchange with diversion is complete |
| $\widetilde{\Delta y}$ | quantity of unit B received in exchange |

As shown above, in an exchange without diversion, the exchange yields 1.87 units B. The diversion can then be the difference between the yields (in units B):

$$D_y = \widetilde{\Delta y} - \Delta y = -1.84 - (-1.87) = 0.03$$

This exchange yields 1.84 units B, equating to an exchange ratio of 1.84 units B per unit A. Automated intermediary platform 120 can divert 0.03 units B to the resource contributors.

Providing 1 unit B into the resource pool ($\Delta y=1$) in exchange for unit A:

$$\tilde{k}_t = x_{start}^{\left(1-\frac{t}{g}\right)} + y_{start}^{\left(1-\frac{t}{g}\right)} = 6.01 = \widetilde{x_{end}}^{1-\frac{t}{g}} + \widetilde{y_{end}}^{1-\frac{t}{g}}$$

$$\widetilde{y_{end}} = y_{start} + \Delta y = 1,000,001$$

$$\widetilde{x_{end}} = \left(\tilde{k}_t - \widetilde{y_{end}}^{1-\frac{t}{g}}\right)^{\frac{1}{1-\frac{t}{g}}} = 499,999.47$$

$$\widetilde{\Delta x} = \widetilde{x_{end}} - x_{start} = -0.53$$

$$Fee_x = \widetilde{\Delta x} - \Delta x = -0.53 - (-0.54) = 0.01$$

where:

| | |
|---|---|
| $\widetilde{x_{end}}$ | quantity of unit A in resource pool after exchange with diversion is complete |
| $\widetilde{y_{end}}$ | quantity of unit B in resource pool after exchange with diversion is complete |
| $\widetilde{\Delta y}$ | quantity of unit B received in exchange |

This exchange yields 0.53 units A, equating to an exchange ratio of 0.53 units A per unit B. Automated intermediary platform 120 can be configured to divert 0.01 unit A to resource contributors.

Scenario 8: Conditional Exchange with Diversion

In this example, a resource pool may include 1,000,000 units representing resource B (unit B) and 500,000 units representing resource A (unit A). An initial time factor t at inception may be 1. As described herein, a user request can specify a minimum exchange ratio for an exchange. Automated intermediary platform 120 can be configured to (at least partially) fulfil a user request matched to the resource pool when the current exchange ratio is greater than or equal to the minimum exchange ratio.

Given provision of 1 unit A into the resource pool ($\Delta x=1$) in exchange for unit(s) B at time t with a diversion factor g and a minimum exchange ratio of p (representing a number of unit(s) A needed to acquire one unit B from the pool), automated intermediary platform 120 can be configured to determine:

$$\tilde{k}_t = x_{start}^{(1-tg)} + y_{start}^{(1-tg)} = \widetilde{x_{end}}^{1-tg} + \widetilde{y_{end}}^{1-tg}$$

$$ratio_{end} = (\widetilde{x_{end}} / \widetilde{y_{end}})^{t \times g} \leq p$$

where:

| | |
|---|---|
| $ratio_{end}$ | Exchange ratio after request is (at least partially) fulfilled |

In order to solve how many units B could be exchanged for before the minimum exchange ratio applies, automated intermediary platform 120 can be configured to determine:

$$\widetilde{x_{end}} = \widetilde{y_{end}} \times p^{\frac{1}{tg}}$$

$$\widetilde{y_{end}}^{1-tg}\left(1 + p^{\frac{1-tg}{tg}}\right) = \widetilde{k_r}$$

Automated intermediary platform 120 can determine the number of units B exchanged out using the following:

$$\Delta y = \widetilde{y_{end}} - y_{start}$$

Automated intermediary platform 120 can determine the number of units A exchanged in using the following:

$$\widetilde{x_{end}} = \widetilde{y_{end}} \times p^{\frac{1}{tg}}$$

$$\Delta x = \widetilde{x_{end}} - x_{start}$$

Alternatively, given provision of 1 unit B into the resource pool ($\Delta x=1$) in exchange for units A at time t with a diversion factor g and a minimum exchange ratio of p (representing a number of units B needed to acquire one unit A from the pool), automated intermediary platform 120 can be configured to determine:

$$\widetilde{k_r} = x_{start}^{(1-t/g)} + y_{start}^{(1-t/g)} = \widetilde{x_{end}}^{1-t/g} + \widetilde{y_{end}}^{1-t/g}$$

$$ratio_{end} = (\widetilde{y_{end}} / \widetilde{x_{end}})^{t/g} \le q$$

where:

| | |
|---|---|
| $ratio_{end}$ | Exchange ratio after request is (at least partially) fulfilled |

Thus:

$$\widetilde{y_{end}} = \widetilde{x_{end}} \times q^{\frac{g}{t}}$$

$$\widetilde{x_{end}}^{1-t/g}\left(1 + q^{\frac{g}{t}-1}\right) = \widetilde{k_r}$$

$$\widetilde{x_{end}} = \left(\widetilde{k_r} / \left(1 + q^{\frac{g}{t}-1}\right)\right)^{\frac{g}{g-t}}$$

Automated intermediary platform 120 can be configured to determine the number of unit A exchanged out using the following:

$$\Delta x = \widetilde{x_{end}} - x_{start}$$

Automated intermediary platform 120 can be configured to determine the number of unit B exchanged in using the following:

$$\widetilde{y_{end}} = \widetilde{x_{end}} \times q^{\frac{g}{t}}$$

$$\Delta y = \widetilde{y_{end}} - y_{start}$$

Concentrated Resource Contribution

In some embodiments, a concentrated resource pool can be modeled as many small contiguous resource pools. Each small resource pool can be associated with an exchange ratio range, such that the overall concentrated resource pool is associated with a set of contiguous exchange ratio ranges. Each small resource pool (and corresponding exchange ratio range) can be associated with finite quantities of resources. Resource contributors can define an exchange ratio range $[P_{min}, P_{max}]$ within which they contribute resources. Quantity (A) can be the quantity of resources provided in a given range. The relationship between resources in the pool can be derived from the Quantity A.

Exchanges within an exchange ratio range (and corresponding resource pool) can be implemented as generally described regarding resource pools. A resource pool can include a tick structure that includes multiple ticks and an anchor exchange ratio. Each tick i may be represented by an exchange ratio range, as described herein. In some embodiments, a number of ticks of a resource pool may not be fixed and may be affected by the anchor exchange ratio.

The anchor exchange ratio may be calculated based on a historical exchange ratio of a resource pool. For example, the anchor exchange ratio may be calculated using a prior exchange ratio of the resource pool (e.g., in the past 24 hours) or the average exchange ratio of the resource pool in the past several days (e.g., past 7 days). In some embodiments, automated intermediary platform 120 can be configured to periodically update the anchor exchange ratio.

In some embodiments, a tick may be created using relative exchange ratios (e.g., 0 or another suitable lower limit, 1%, 2%, ..., 99%, 100%, ... 199%, 200% or another suitable upper limit). A base of the exchange ratio may be the anchor exchange ratio, and each tick may span 1% from the anchor exchange ratio. For example, tick no. 1 (i=1) may span from 0 to 1% of the anchor exchange ratio and tick no. 199 (i=199) may span from 198% to 199% of the anchor exchange ratio. In some embodiments, the highest upper limit of all tick limits may not be greater than 1. For example, in some embodiments, a relative exchange ratio of resource B in the unit of resource A may be less than or equal to 1. In some embodiments, a number of ticks in a pool at time t may be decided by the anchor exchange ratio and its relative ratio to 1. For example, if the anchor exchange ratio is 0.4, the pool may consist of 200 ticks. Alternatively, if the anchor exchange ratio is 0.8, the pool may consist of 125 ticks.

At any time t, a resource contributor can provide units representing resources to a resource pool. In some embodiments, a resource contributor can choose a tick and a quantity of units to provide. In some embodiments, a resource contributor can input a quantity of units and select a range of ticks. For example, a resource contributor may provide 20 units A and 15 units B to the tick spanning from 99% to 100% of the anchor exchange ratio. If the resource contributor provides a certain quantity of units on multiple ticks of the anchor exchange ratio, such as multiple ticks spanning from 95% to 100% of the anchor exchange ratio, the resources that the resource contributor provided may be divided into each tick (e.g., equally such that each tick receives one-fifth of a total resources that the resource contributors provide to the pool, or according to another suitable method).

In this example, a resource pool may include units representing resource B (unit B) and resource A (unit A). A real quantity of each of units A and units B in each tick may be determined by summing units A and units B provided to each tick by all resource contributors.

If the highest upper limit of all tick limits goes beyond 1, a real quantity of any ticks with a lower limit above 1 may be added to a tick with a highest lower limit exchange ratio less than 1. This way, a higher limit exchange ratio of a tick may be set to 1 even if a relative higher limit based on the anchor exchange ratio is greater than 1. As an example, where the anchor exchange ratio is 0.8, the highest exchange ratio for tick i=200 would be 0.8*200=1.6 which is greater than 1. In this case, since an exchange ratio of a resource pool will not go beyond 1, the resource pool would consist of 125 ticks instead of 200 ticks and tick i=125 would have a relative exchange ratio range of 124% to 125% and a real exchange ratio range of 0.992 to 1. A real quantity of ticks i>125 may be summed and added into tick i=125.

Automated intermediary platform 120 can be configured to use a current exchange ratio to navigate among ticks associated with a concentrated resource pool. The current exchange ratio can depend on the ratio of the quantities of units in the resource pool. Such a formulation can enable efficient computation of exchange ratio and quantity within the active range. In some embodiments, automated intermediary platform 120 can be configured to use quantities within each tick the determining exchanges.

Scenario 9: Time-Dependent Invariant Function

In this example, a resource pool may include units representing resource B (unit B) and resource A (unit A). Given time t, in a tick i with an exchange ratio range ($P_{\alpha,i}$, $P_{b,i}$), automated intermediary platform 120 can be configured to use the following invariant function:

$$(x_{r,i} + x_{v,i})^{1-t} + (y_{r,i} + y_{v,i})^{1-t} = k_{t,i}$$

where:

| | |
|---|---|
| $r_{a,i}$ | lower exchange ratio limit of the current tick i, known ex-ante |
| $r_{b,i}$ | Higher exchange ratio limit of the current tick i, known ex-ante |
| $x_{r,i}$ | real quantity of unit A in the current tick i, known ex-ante |
| $x_{v,i}$ | virtual quantity of unit A in the current tick i |
| $y_{r,i}$ | real quantity of unit B in the current tick i, known ex-ante |
| $y_{v,i}$ | virtual quantity of unit B in the current tick i |
| $k_{t,i}$ | invariant constant for the current tick i |

Virtual quantities ($x_{v,i}$ and $y_{v,i}$) may be calculated based on the invariant constant, the lower and upper exchange ratio limits of the tick, and the time factor. These terms may allow for smooth transitions between ticks as units of resources are exchanged. Virtual quantities may be determined as follows:

$$x_{v,i} = \left( k_{t,i} * r_{a,i}^{\frac{1-t}{t}} \Big/ \left( 1 + r_{a,i}^{\frac{1-t}{t}} \right) \right)^{\frac{1}{1-t}}$$

$$y_{v,i} = \left( k_{t,i} \Big/ \left( 1 + r_{b,i}^{\frac{1-t}{t}} \right) \right)^{\frac{1}{1-t}}$$

where $k_{t,i}$ may be estimated based on known values of $T_{\alpha,i}$, $T_{b,i}$, $x_{r,i}$ and $y_{r,i}$. The estimate of $k_{t,i}$ can be represented as $\widetilde{k_{t,i}}$ When a real quantity of unit A in a current pool is depleted, a remaining real quantity of unit A inside tick i may be $\widetilde{x_{r,i}} = 0$. Assuming a real quantity of unit B left in tick i is $\widetilde{y_{r,i}}$, the invariant function may be the following:

$$(\widetilde{x_{r,i}} + x_{v,i})^{1-t} + (\widetilde{y_{r,i}} + y_{v,i})^{1-t} = \widetilde{k_{t,i}},$$

$$(0 + x_{v,i})^{1-t} = \left( \widetilde{k_{t,i}} * r^{\frac{1-t}{a,i}} \Big/ \left( 1 + r^{\frac{1-t}{a,i}} \right) \right)^{\frac{1}{1-t}*(1-t)} = \widetilde{k_{t,i}} * r^{\frac{1-t}{a,i}} \Big/ \left( 1 + r^{\frac{1-t}{a,i}} \right),$$

-continued $$\widetilde{k_{t,i}} * r_{a,i}^{\frac{1-t}{t}} \Big/ \left( 1 + r_{a,i}^{\frac{1-t}{t}} \right) + (\widetilde{y_{r,i}} + y_{v,i})^{1-t} = \widetilde{k_{t,i}},$$

$$(\widetilde{y_{r,i}} + y_{v,i})^{1-t} = \widetilde{k_{t,i}} * \left( 1 - \frac{r_{a,i}^{\frac{1-t}{t}}}{1 + r_{a,i}^{\frac{1-t}{t}}} \right) = \frac{\widetilde{k_{t,i}}}{1 + r_{a,i}^{\frac{1-t}{t}}}$$

Based on the above, the current exchange ratio $r_t$ of the pool may be determined as follows:

$$r_t = \left( \frac{\widetilde{x_{r,i}} + x_{v,i}}{\widetilde{y_{r,i}} + y_{v,i}} \right)^t = \left( \frac{\left( \widetilde{k_{t,i}} * r_{a,i}^{\frac{1-t}{t}} \Big/ \left( 1 + r_{a,i}^{\frac{1-t}{t}} \right) \right)^{\frac{1}{1-t}}}{\left( \frac{\widetilde{k_{t,i}}}{1 + r_{a,i}^{\frac{1-t}{t}}} \right)^{\frac{1}{1-t}}} \right)^t = \left( r_{a,i}^{\frac{1-t}{t}} \right)^{\frac{t}{1-t}} = r_{a,i}$$

Since $r_{\alpha,i}$ is the lower exchange ratio boundary of the current tick i, when the real quantity of unit A in the current tick is depleted, the current exchange ratio may move to the lower boundary of the current tick and may be ready to move to the tick (i−1) on the left side of the current tick i (e.g., the upper exchange ratio boundary of the tick (i−1) equals to the lower exchange ratio boundary of the tick i, $r_{b,i-1}=T_{\alpha,i}$). The new tick (i−1) would have a lower exchange ratio boundary of $T_{\alpha,i-1}<r_{\alpha,i}$, and a new real quantity of unit A would be $x_{r,i-1}$.

On the other hand, when the real quantity of unit B in the current pool is depleted, the current exchange ratio of the pool may move right to the upper exchange ratio boundary of the current tick $r_{b,i}$ and may be ready to move to the tick (i+1) on the right of the current tick i. The tick (i+1) may have a greater upper exchange ratio boundary of $r_{b,i+1}>r_{b,i}$, and a real quantity of unit B of $y_{r,i+1}$.

An exchange may involve a resource pool. The resource pool can include a tick structure which consists of tick information, lower and upper limits of each tick together with the real quantity within each tick, and a current exchange ratio of the pool at time t. Automated intermediary platform 120 can be configured to match a user request specifying an exchange direction (e.g., unit A to unit B or unit B to unit A) and a number of exchanged units Δx or Δy.

Scenario 10: Time-Independent Invariant Function

In this example, a resource pool may include units representing resource B (unit B) and resource A (unit A). As described herein, the invariant function can be:

$$x_{end} * y_{end} = k = x_{start} * y_{start}$$

and the exchange ratio can be:

$$R_x = \frac{y}{x}$$

$$R_y = \frac{x}{y}$$

In some embodiments, the automated intermediary platform 120 can be configured to consider a function of the exchange ratio, for example:

$$\sqrt{R_x} = \sqrt{\frac{y}{x}}$$

In some instances, the entire quantity of a first unit (e.g., unit A) within an exchange ratio range can be exchanged for the second unit in the pool (e.g., unit B), leaving the exchange ratio range depleted of unit A. In such an instance, the exchange ratio should move to either of the endpoints, shifting to the next higher or lower exchange ratio range. A quantity A can be determined such that the exchange ratio moves appropriately based on the maximum changes $\Delta x$ and $\Delta y$ necessary to effectuate the desired shift in exchange ratio.

$$A = \Delta x \frac{\sqrt{R_b} * \sqrt{R_c}}{\sqrt{R_b} - \sqrt{R_c}}$$

$$A = \frac{\Delta y}{\sqrt{R_c} - \sqrt{R_a}}$$

where,

| | |
|---|---|
| $R_a$ | is the lower exchange ratio boundary of the current tick |
| $R_b$ | is the higher exchange ratio boundary of the current tick |
| $R_c$ | is the current exchange ratio in the current tick |

When exchanging items within an exchange ratio range, only VR changes and A remains unchanged. Exchanging items can change the current exchange ratio. Automated intermediary platform 120 can be configured to enable users to choose an intended exchange ratio following the exchange. Automated intermediary platform 120 can be configured, based on the chosen exchange ratio, to determine a quantity of first unit (e.g., unit A) provided and a quantity of the second unit (e.g., unit B) returned.

$$A = \frac{\Delta y}{\Delta \sqrt{R}}$$

$$\Delta \sqrt{R} = \frac{\Delta y}{A}$$

The maximum number quantity of the second unit (e.g., unit B) that can be returned from within the exchange ratio range can be calculated as follows:

$$\Delta y = A\left(\sqrt{R_b} - \sqrt{R_a}\right)$$

$$\Delta x = \frac{A\left(\sqrt{R_b} - \sqrt{R_a}\right)}{\sqrt{R_b} * \sqrt{R_a}}$$

Automated intermediary platform 120 can be configured to switch to another exchange ratio range if the current exchange ratio range is depleted of the second unit and continue exchanging units until the user request is fulfilled. Coordination Logic with a Resource Pool Automated intermediary platform 120 can be configured to match a user request to a resource pool when the user request cannot be matched to one or more other user requests in the request database or if such a step is skipped. Automated intermediary platform 120 can be configured to perform the following operations in matching the user request to the resource pool.

Automated intermediary platform 120 can locate the current tick i based on current exchange ratio $p_t$ and tick information. If the current exchange ratio is equal to an exchange ratio limit separating two neighbor ticks, automated intermediary platform 120 can determine the current tick based on an exchange direction. For example, if the anchor exchange ratio $r_0$ is 0.6, the current exchange ratio rt of the pool may also be 0.6. Given a user request to exchange in unit A and exchange out unit B, the current tick may be 100% to 101%. Alternatively, a user request to exchange out unit B and exchange in unit A, then the current tick may be 99% to 100%.

Once the current tick i is determined, automated intermediary platform 120 can estimate the invariant constant $k_{t,i}$ and virtual quantity of both units (e.g., unit A and unit B) in tick i using the invariant function with the known value of real quantities of both units, the lower and higher exchange ratio boundaries of tick i and time t. For example, automated intermediary platform 120 may perform an in-tick transaction using the following invariant function (discussed above):

$$(x_{r,i} + x_{v,i})^{1-t} + (y_{r,i} + y_{v,i})^{1-t} = k_{t,i}$$

Automated intermediary platform 120 can determine 1) a maximum number of exchanged-in units that the current tick could absorb and 2) whether the user request specifies exchanging in a greater number of units. If so, automated intermediary platform 120 can drain the current tick and proceed to the next tick. Given a user request specifying exchanging in unit A and exchanging out unit B, if the current tick is drained, the remaining real quantity of unit B in tick i after the exchange may become zero: $\widetilde{y_{r,i}} = 0$. Using the known values of the real quantity of both units in tick i before the exchange ($x_{r,i}$ and $y_{r,i}$), the virtual quantity ($x_{v,i}$ and $y_{v,i}$), the remaining real quantity of unit B($\widetilde{y_{r,i}}$) and the estimate of invariant constant ($\widetilde{k_{t,i}}$), Automated intermediary platform 120 can calculate remaining real quantity of unit A ($\widetilde{x_{r,i}}$) exchanged out and the maximum quantity of unit A that the current tick could absorb ($\Delta x_{i_{max}} = \widetilde{x_{r,i}} - x_{r,i}$). The quantity of unit B exchanged out may be $\widetilde{\Delta y_{i_{max}}} = y_{r,i}$.

Similarly, given a user request specifying exchanging in unit B and exchanging out unit A, automated intermediary platform 120 can calculate a maximum quantity of unit B that the current tick could absorb ($\Delta y_{i_{max}}$) and a quantity of unit A exchanged out ($x_{r,i}$).

Automated intermediary platform 120 can receive a user request specifying an exchange direction (e.g., unit A to unit B, unit B to unit A) and a number of exchanged in units $\Delta x$ or $\Delta y$. Given a user request specifying exchanging unit A for unit B and the exchanged in unit A quantity is $\Delta x$, Automated intermediary platform 120 can compare a value of $\Delta x$ with a maximum quantity of unit A that the current tick could absorb ($\Delta x_{i_{max}}$).

If $\Delta x \leq \Delta x_{i_{max}}$, the current tick i may fully absorb the quantity of the exchanged-in unit. For example, the number of unit A left in tick i after the exchange may become $\widetilde{x_{r,i}} = x_{r,i} + \Delta x$. Based on known values of $x_{r,i}$, $y_{r,i}$, $x_{v,i}$, $y_{v,i}$, $\widetilde{x_{r,i}}$ and $\widetilde{k_{t,i}}$, Automated intermediary platform 120 can estimate the real quantity of unit B left in tick i after the transaction ($\widetilde{y_{r,i}}$).. The quantity of unit B that this exchange would exchange out may be $\widetilde{\Delta y} = y_{r,i} - \widetilde{y_{r,i}}$. Automated intermediary platform 120 can record the new real quantity of units in the current tick i and may determine the new current exchange ratio of the resource pool to be $$r_t = \left( \frac{\widetilde{x_{r,i}} + x_{v,i}}{\widetilde{y_{r,i}} + y_{v,i}} \right)^t.$$

If $\Delta x > \Delta x_{i_{max}}$, the current tick i may not be able to absorb the full quantity of the exchanged-in units. In this case, the quantity of the exchanged-out units, units B, in the current tick i may be fully withdrawn ($(\widetilde{\Delta y} = y_{r,i})$ and the real quantity of units B left in tick i may be $\widetilde{y_{r,i}} = 0$. The real quantity of units A in the current tick may become $\widetilde{x_{r,i}} = x_{r,i} + \Delta x_{i_{max}}$. The exchange ratio can become the higher limit exchange ratio of the current tick ($r_t = r_{b,i}$). Automated intermediary platform 120 can record the real quantity of units in the current tick as well as the current exchange ratio of the pool. Automated intermediary platform 120 can return to locating the current tick i with a new exchanged-in unit quantity ($(\widetilde{\Delta x} = \Delta x - \Delta x_{i_{max}})$ and the current exchange ratio of the pool may move into the adjacent, higher exchange ratio tick (i+1).

Single-Tick Exchange

As described herein, automated intermediary platform 120 can satisfy user requests using resources entirely within a single tick. As the current exchange ratio moves within the tick, units representing resource A (e.g., units A) and units representing resource B (e.g., units B) can be exchanged according to an invariant function, as described herein.

Given a resource pool including a real quantity of 500,000 units A(x), 1,000,000 units B, and an initial time factor (t) at inception being 1. Automated intermediary platform 120 can calculate the exchange ratio of the resource pool using the real quantities of both units as follows:

$$R_y = (x/y)^1 = 0.5$$

When implementing concentrated resource contributions, automated intermediary platform 120 can calculate the current exchange ratio inside each tick in terms of real and virtual unit quantities. The initial exchange ratio and anchor exchange ratio can be manually defined or defined based on historical data, as described herein. In this example, the initial exchange ratio (and optionally the anchor exchange ratio) may be manually defined as P=0.5 for the first exchange. The resource pool can include a tick structure divided into 200 ticks based on this initial exchange ratio. The exchange ratio boundaries of the ticks may range from 0 to 1, each exchange ratio limit distanced 0.005 (e.g., 1%*P) from each other. For example, the exchange ratio boundaries of the ticks could be 0 to 0.005, 0.005 to 0.01, . . . 0.495 to 0.5, 0.5 to 0.505, . . . 0.995 to 1. In this case, the exchange ratio range of the first tick may be from 0 to 0.005 and the exchange ratio range of the last tick may be from 0.995 to 1.

In this example, if the anchor exchange ratio were higher than 0.5, the distance between each exchange ratio boundary would be higher than 0.005, and the total number of ticks would be less than 200 as the upper exchange ratio boundary of the last tick would be 1. If the anchor exchange ratio were lower than 0.5, the total number of ticks would be 200, and the upper exchange ratio boundary of the last tick would be less than 1.

Once the anchor exchange ratio, which determines the distribution of ticks, is determined, automated intermediary platform 120 can match the current exchange ratio to it and find out the current tick that a first exchange would be processed within. In this case, the current exchange ratio equals 0.5, which corresponds to the value of the limit exchange ratio that separates tick 100 (e.g., range 0.495 to 0.5) and tick 101 (e.g., range 0.5 to 0.505). In some instances, automated intermediary platform 120 can determine the tick in which to exchange resources based on a direction of the exchange. Given a user request that specifies exchanging unit A ($\Delta x > 0$) for unit B, the real quantity of unit A ($x_r$) in the resource pool may increase and the real quantity of unit B ($y_r$) in the pool may decrease, causing the current exchange ratio of the pool to increase into the exchange ratio range of tick 101. Given a user request that specifies exchanging unit B ($\Delta y > 0$) for unit A, the real quantity of unit B ($y_r$) in the resource pool may increase and the real quantity of unit A ($x_r$) in the pool may decrease, causing the current exchange ratio of the pool to decrease into the exchange ratio range of tick 100.

Given a first user request matching to the resource pool at time t=0.9, with a current exchange ratio of 0.5, the user request specifying the exchange of 1 unit of unit A ($\Delta x = 1$) for a quantity of unit B, automated intermediary platform 120 can determine that the current tick in the tick structure associated with the resource pool is i=101 (e.g., lower exchange ratio limit $p_{\alpha,i} = 0.5$ and higher exchange ratio limit $p_{b,i} = 0.505$). In this example, the real quantities of the units within the current tick can be 2,500 units A ($x_{r,i}$) and 5,000 units B ($y_{r,i}$). Automated intermediary platform 120 can estimate the invariant variable ($k_{t,i}$) and virtual quantities ($x_{v,i}$ and $y_{v,i}$) in the current tick as follows:

$$(x_{r,i} + x_{v,i})^{1-t} + (y_{r,i} + y_{v,i})^{1-t} = k_{t,i}$$

$$x_{v,i} = \left( k_{t,i} * p_{a,i}^{\frac{1-t}{t}} \middle/ \left(1 + p_{a,i}^{\frac{1-t}{t}}\right) \right)^{\frac{1}{1-t}}$$

$$y_{v,i} = \left( k_{t,i} \middle/ \left(1 + p_{b,i}^{\frac{1-t}{t}}\right) \right)^{\frac{1}{1-t}}$$

For example:

$$\left(2500 + \left(k_{t,i} * 0.5 \frac{1-09}{0.9} \middle/ \left(1 + 0.5^{\frac{1-0.9}{0.9}}\right)\right)^{\frac{1}{1-0.9}}\right)^{1-0.9} +$$

$$\left(5000 + \left(k_{t,i} \middle/ \left(1 + 0.505^{\frac{1-0.9}{09}}\right)\right)^{\frac{1}{1-0.9}}\right)^{1-0.9} = k_{t,i}$$

Solving the above about $k_{t,i}$, by using the optimization method, automated intermediary platform 120 may estimate the invariant constant: $\widetilde{k_{t,i}} = 8.1682$, the virtual quantity of unit A: $x_{v,i} = 871,954.54$, and the virtual quantity of unit B: $y_{v,i} = 1,873,538.38$. Using these values, automated intermediary platform 120 can be configured to calculate a maximum of exchange of unit A that could be absorbed by the current tick, by assuming all real quantity of unit B is withdrawn (e.g., $\widetilde{y_{r,i}}=0$). With the invariant function:

$$(\widetilde{x_{r,i}}+x_{v,i})^{1-t}+(\widetilde{y_{r,i}}+y_{v,i})^{1-t}=\widetilde{k_{t,i}},$$

$$\widetilde{x_{r,i}}=(\widetilde{k_{t,i}}-y_{v,i}^{1-t})^{\frac{1}{1-t}}-x_{v,i}=5018.71$$

The maximum of exchange of unit A for current tick i may be determined as follows:

$$\Delta x_{i_{max}}=\widetilde{x_{r,i}}-x_{r,i}=5018.71-2500=2518.71$$

Once the maximum of exchange for unit A is reached, the current exchange ratio may become the higher current exchange ratio limit $(p_{b,i})$ of the current tick i and the lower current exchange ratio limit of the next tick (i+1), and may be determined as follows:

$$p_t=\left(\frac{\widetilde{x_{r,i}}+x_{v,i}}{y_{v,i}}\right)^t=0.505=p_{b,i},$$

Automated intermediary platform 120 can be configured to compare the exchanged unit quantity ($\Delta x$) with the maximum exchange of unit A ($\Delta x_{i_{max}}$). If $\Delta x \leq \Delta x_{i_{max}}$, automated intermediary platform 120 can use the invariant function to calculate the exchanged quantity of unit B, by setting $\widetilde{x_{r,i}}=x_{r,i}+\Delta x=2500+1=2501$. $\widetilde{y_{r,i}}$ may be estimated based on the following:

$$(\widetilde{x_{r,i}}+x_{v,i})^{1-t}+(\widetilde{y_{r,i}}+y_{v,i})^{1-t}=\widetilde{k_{t,i}},$$

$$(2501+871954.54)^{1-0.9}+(\widetilde{y_{r,i}}+1873538.38)^{1-0.9}=8.1682$$

$$\widetilde{y_{r,i}}=4998.01$$

The exchanged quantity of unit B from tick i may be $\widetilde{\Delta y}=y_{r,i}-\widetilde{y_{r,i}}=5000-4998.01-1.99$. The new current exchange ratio may be determined as follows:

$$p_t=\left(\frac{\widetilde{x_{r,i}}+x_{v,i}}{\widetilde{y_{r,i}}+y_{v,i}}\right)^t=\left(\frac{2501+871954.54}{4998.01+1873538.38}\right)^{0.9}=0.5025$$

Automated intermediary platform 120 can be configured to update variable information about tick i for the next exchange.

Cross-Tick Exchange

Automated intermediary platform 120 can perform cross tick exchanges when, based on the quantities of two units in a tick of a resource pool, the tick cannot absorb the total quantity of one unit specified in a user request matched to the pool. In such instances, automated intermediary platform 120 can repeatedly determine a current tick, determine the maximum quantity of the specified unit that the current tick can absorb, determine the resulting quantity of the other unit returned as a result of that exchange, and update the total quantity of the specified unit by subtracting the absorbed quantity. If the maximum quantity for the current tick is greater than the updated total quantity, then automated intermediary platform 120 can perform the exchange entirely within the current tick. Automated intermediary platform 120 can accumulate the returned quantities of the other unit and provide the accumulated quantity in fulfillment of the user request.

Continuing with the prior example, given another user request matching to the resource pool at time t=0.8, with a current exchange ratio of 0.5025, the user request specifying the exchange of 10,000 units B ($\Delta y=10,000$) for a quantity of units A, automated intermediary platform 120 can determine that the current tick in the tick structure associated with the resource pool is i=101 (e.g., lower exchange ratio limit $p_{\alpha,i}=0.5$ and higher exchange ratio limit $p_{b,i}=0.505$). In this example, the real quantities of the units within the current tick can be 2,501 units A ($x_{r,i}$) and 4998.01 units B ($y_{r,i}$). Automated intermediary platform 120 can estimate the invariant variable ($k_{t,i}$) and virtual quantities ($x_{v,i}$ and $y_{v,i}$) in the current tick as follows:

$$\left(2501+\left(k_{t,i}*0.5\frac{1-0.8}{0.8}/\left(1+0.5^{\frac{1-0.8}{0.8}}\right)\right)^{\frac{1}{1-0.8}}\right)^{1-0.8}+$$

$$\left(4998.01+\left(k_{t,i}/\left(1+0.505^{\frac{1-0.8}{0.8}}\right)\right)^{\frac{1}{1-0.8}}\right)^{1-0.8}=k_{t,i}$$

Solving the above about $k_{t,i}$, by using the optimization method, automated intermediary platform 120 can estimate the invariant constant: $\widetilde{k_{t,i}}=32.6752$, the virtual quantity of units A: $x_{v,i}=740,719.59$, and the virtual quantity of units B: $y_{v,i}=1,751,750.40$. Using these values, automated intermediary platform 120 can determine a maximum quantity of units B that can be absorbed by the current tick, by assuming that the entire real quantity of units A is withdrawn (e.g., $\widetilde{x_{r,i}}=0$). With the invariant function:

$$(\widetilde{x_{r,i}}+x_{v,i})^{1-t}+(\widetilde{y_{r,i}}+y_{v,i})^{1-t}=\widetilde{k_{t,i}},$$

$$\widetilde{y_{r,i}}=(\widetilde{k_{t,i}}-x_{v,i}^{1-t})^{\frac{1}{1-t}}-y_{v,i}=9987.61$$

The maximum quantity of unit B for current tick i may be determined as follows:

$$\Delta y_{i_{max}}=\widetilde{y_{r,i}}-y_{r,i}=9987.61-4998.01=4989.60$$

Once the maximum exchanged quantity of units B is reached, the current exchange ratio may become the lower current exchange ratio limit $(p_{\alpha,i})$ of the current tick i and the higher current exchange ratio limit of the next tick (i-1), and may be determined as follows:

$$p_t=\left(\frac{x_{v,i}}{\widetilde{y_{r,i}}+y_{v,i}}\right)^t=0.5=p_{a,i},$$

Automated intermediary platform 120 can be configured to compare the quantity of units B specified in the user request ($\Delta y$) with the determined maximum unit quantity for the tick ($\Delta y_{i_{max}}$). Since $\Delta y \geq \Delta y_{i_{max}}$, this exchange may drain the current tick i and move to the next tick (i-1). Automated intermediary platform 120 can be configured to use the invariant function to calculate the quantity of unit A returned as follows:

$$\widetilde{\Delta x_{i}}=x_{r,i}=2501$$

The resource information of the current tick i may be updated such that the new real quantity of unit A: $x_{r,i}=0$ and the new real quantity of unit B: $y_{r,i}=9987.61$.

Automated intermediary platform 120 can proceed to the next tick (i−1) with an updated total quantity of unit B ( $\widetilde{(\Delta y)}=\Delta y - \Delta y_{i_{max}}=10000-4989.60=5010.40$), assuming the time factor t=0.8, the lower exchange ratio limit of the current tick $P_{\alpha, i-1}$=0.495, the higher exchange ratio limit of the current tick $p_{b, i-1}$=0.5. In this example, the real quantities of the units within the current tick can be 5000 unit A ($x_{r,i}$) and 8000 unit B ($y_{r,i}$). Automated intermediary platform 120 can estimate the invariant variable ($k_{t,i}$) and virtual quantities ($x_{v,i}$ and $y_{v,i}$) in the current tick as follows:

$$\left(5000 + \left(k_{t,i} * 0.495^{\frac{1-0.8}{0.8}} \Big/ \left(1 + 0.495^{\frac{1-0.8}{0.8}}\right)\right)^{\frac{1}{1-0.8}}\right)^{1-0.8} +$$

$$\left(8000 + \left(k_{t,i} \Big/ \left(1 + 0.5^{\frac{1-0.8}{0.8}}\right)\right)^{\frac{1}{1-0.8}}\right)^{1-0.8} = k_{t,i}$$

Solving the above about $k_{t,i}$, by using the optimization method, automated intermediary platform 120 can estimate the invariant constant: $\widetilde{k_{t,i\text{-}1}}$=36.6846, the virtual quantity of unit A: $x_{v,i-1}$=1,312,257.20, and the virtual quantity of unit B: $y_{v,i-1}$=3,142,475.77. Using these values, automated intermediary platform 120 can determine a maximum quantity of unit B that can be absorbed by the current tick, by assuming that the entire real quantity of unit A is withdrawn (e.g., $\widetilde{x_{r,i}}$=0). With the invariant function:

$$(\widetilde{x_{r,i\text{-}1}} + x_{v,i-1})^{1-t} + (\widetilde{y_{r,i\text{-}1}} + y_{v,i-1})^{1-t} = \widetilde{k_{t,i\text{-}1}},$$

$$\widetilde{y_{r,i\text{-}1}} = \left(\widetilde{k_{t,i\text{-}1}} - x_{v,i-1}^{1-t}\right)^{\frac{I}{1-t}} - y_{v,i-1} = 18072.78$$

The maximum quantity of unit B for current tick i may be determined as follows:

$$\Delta y_{i-1_{max}} = \widetilde{y_{r,i\text{-}1}} - y_{r,i-1} = 18072.78 - 8000 = 10072.78$$

Automated intermediary platform 120 can compare the updated total quantity of unit B ($\widetilde{\Delta y}$) with the maximum quantity of unit B for current tick i($\Delta y_{i-1_{max}}$). Since $\widetilde{\Delta y} \le \Delta y_{i-1_{max}}$, automated intermediary platform 120 can use the invariant function to calculate the returned quantity of unit A by setting $\widetilde{y_{r,i\text{-}1}} = y_{r,i-1} + \widetilde{\Delta y} = 8000 + 5010.40 = 13010.40$. Then:

$$(\widetilde{x_{r,i\text{-}1}} + x_{v,i-1})^{1-t} + (\widetilde{y_{r,i\text{-}1}} + y_{v,i-1})^{1-t} = \widetilde{k_{t,i\text{-}1}},$$

$$(\widetilde{x_{r,i\text{-}1}} + 1312257.20)^{1-0.8} + (13010.40 + 3142475.77)^{1-0.8} = 36.6846$$

Automated intermediary platform 120 can estimate $\widetilde{x_{r,i\text{-}1}}$=2509.40. The returned quantity of unit A from tick (i−1) may be $\widetilde{\Delta x_{i-1}} = x_{r,i-1} - \widetilde{x_{r,i\text{-}1}} = 5000 - 2509.40 = 2490.60$. The current exchange ratio may be determined as follows:

$$p_t = \left(\frac{\widetilde{x_{r,i\text{-}1}} + x_{v,i-1}}{\widetilde{y_{r,i\text{-}1}} + y_{v,i-1}}\right)^t = \left(\frac{2509.40 + 1312257.20}{13010.40 + 3142475.77}\right)^{0.8} = 0.4964$$

Automated intermediary platform 120 can accumulate the returned quantity of unit A by summing the returned quantity from all ticks as follows:

$$\widetilde{\Delta x} = \widetilde{\Delta x_i} + \widetilde{\Delta x_{i-1}} = 2501 + 2490.60 = 4991.60$$

Automated intermediary platform 120 can be configured to update variable information about tick i for the next exchange.

In an extreme situation, a user request can specify a quantity of one unit sufficient to deplete all ticks and still have a remaining quantity. The remaining quantity may be left on a request database, as described herein. Automated intermediary platform 120 can then match the remaining quantity to subsequent user requests, or to the resource pool if additional resources are contributed to the pool. Similar methods may be applied to user requests specifying minimum or maximum conditions on exchange ratios (i.e., units representing resources can be exchanged until the condition is no longer satisfied, then the remainder of the user request can be recorded to the request database).

Coordination Logic (Concentrated Resource Contribution)

Automated intermediary platform 120 can be configured to perform a coordination process to satisfy user requests, consistent with disclosed embodiments. The coordination process can include matching received user requests against other received requests or requests recorded in the request database (e.g., non-pool matching). As may be appreciated, some user requests may specify a condition on an exchange ratio (e.g., maximum or minimum exchange ratio), while some user requests may not specify such conditions.

Automated intermediary platform 120 can be configured to match user requests without conditions against each other, then match any unfulfilled user requests without conditions against the resource pool.

Automated intermediary platform 120 can match requests without conditions against requests with conditions. Such matching can be performed at an exchange ratio that satisfies the conditions on the requests.

Automated intermediary platform 120 can match user requests with conditions against the resource pool. As may be appreciated, user requests may specify exchanges of first unit(s) representing a first resource (e.g., units A) for second unit(s) representing a second resource (e.g., units B), or the units B for the units A. In some embodiments, a user request specifying an exchange of the units A for the units B can specify a minimum exchange ratio of the first unit for the second unit (e.g., a minimum ratio B/A). Likewise, a user request specifying an exchange of the units B for the units A can specify a minimum exchange ratio of the units B for the units A (e.g., a minimum ratio A/B), or equivalently a maximum exchange ratio of the units A for the units B (e.g., a maximum ratio B/A).

Automated intermediary platform 120 can match user requests specifying exchanges of units A for units B to the resource pool, driving down the current exchange ratio, until either the minimum exchange ratio conditions of all such requests are unsatisfied, or until the maximum exchange ratio conditions of one or more user requests specifying exchanges of the units B for the units A are satisfied.

Automated intermediary platform 120 can then match the satisfied user requests specifying exchanges of the units B for units A, driving up the current exchange ratio, until either the maximum exchange ratio conditions of all such requests are unsatisfied or the minimum exchange ratio conditions of one or more user requests specifying exchanges of the units A for the units B are satisfied.

Automated intermediary platform 120 can match user requests with overlapping conditions against each other. For example, a first user request can specify an exchange of units A for a units B with a minimum exchange ratio of the units A for the units B. A second request can specify an exchange of the units A for the units B with a maximum exchange ratio of the units A for the units B. If the maximum exchange ratio of the second request is greater than the minimum exchange ratio of the first request, then automated intermediary platform 120 can match the first request to the second request.

Automated intermediary platform 120 can terminate the coordination process if unable to find valid matches across user requests without conditions, with conditions, and against the resource pool.

Automated intermediary platform 120 can send a fulfilled user request (or the partially fulfilled portion of a user request) to an exchange service (e.g., exchange service 308 of FIG. 3) and recorded the exchange in the exchange database (e.g., exchange database 309 of FIG. 3). Automated intermediary platform 120 can return an unfulfilled user request (or the unfulfilled portion of a user request) to a request service (e.g., request service 313 of FIG. 3) and record the unfilled request or portion in the request database (e.g., request database 314 of FIG. 3). Automated intermediary platform 120 can then await receipt of additional user requests that may fulfill the unfulfilled order or unfulfilled portion of the order. When an order (or portion thereof) is fulfilled, Automated intermediary platform 120 may record the exchange in the user profile of the user that provide the request.

Another aspect of the disclosure is directed to a non-transitory computer-readable medium storing instructions which, when executed, cause one or more processors to perform the disclosed methods. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed systems and related methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. An automated intermediary system comprising:
   at least one user request database;
   at least one processor; and
   at least one non-transitory computer readable medium containing instructions that, when executed by the at least one process, cause the automated intermediary system to perform operations comprising:
      receiving resource contributions and creating a resource pool using the resource contributions, the resource pool including:
         a tick structure,
         a balanced quantity of a first resource and a second resource, and
         wherein the resource contributions are allocated to ticks in the tick structure;
      receiving a user request specifying an exchange of a quantity of the first resource recorded in a user profile of a first user for the second resource;
      matching the user request to one or more stored user requests in the user request database and determining a first returned resource quantity and an unsatisfied portion of the user request including a remaining resource quantity;
      in response to the determination of the unsatisfied portion of the user request, matching the unsatisfied portion of the user request to the resource pool and determining a second returned resource quantity based on the remaining resource quantity and current quantities of the first and second resources in the resource pool, wherein determining the second returned resource quantity comprises:
         determining a current tick in the tick structure;
         determining a maximum provided quantity of the first resource based on real and virtual quantities of the first and second resources in the current tick;
         determining the maximum provided quantity of the first resource exceeds a remaining submitted quantity of the first resource; and
         determining the second returned resource quantity based on the remaining submitted quantity of the first resource;
      updating the user profile of the first user based on the first and second returned resource quantities; and
      in response to a request from the first user, withdrawing a portion of the first and second returned resource quantities from the automated intermediary system and updating the user profile of the first user.

2. The automated intermediary system of claim 1, wherein:
   the first and second resources comprise at least one of cloud computing resources, communication network resources, or virtual machine types.

3. The automated intermediary system of claim 1, wherein:
   the resource pool includes base units, complete units, or partially complete units.

4. The automated intermediary system of claim 1, wherein:
   the second returned resource quantity is determined based on a base, partially complete, or complete exchange ratio for the resource pool.

5. The automated intermediary system of claim 1, wherein:
   the second returned resource quantity is determined according to an invariant function.

6. The automated intermediary system of claim 5, wherein:
   the invariant function comprises an additive or multiplicative invariant function.

7. The automated intermediary system of claim 5, wherein:
   the invariant function is a time-dependent invariant function.

8. The automated intermediary system of claim 1, wherein:
   the quantity of the first resource recorded in the user profile comprises a quantity of bundled resources obtained from a second user.

9. The automated intermediary system of claim 1, wherein:
   determining the second returned resource quantity further comprises determining a diverted resource quantity.

10. A set of non-transitory computer-readable media collectively containing instructions that, when executed by at least one processer of an automated intermediary system, cause the automated intermediary system to perform operations comprising:

receiving resource contributions and creating a balanced resource pool using the resource contributions, the balanced resource pool including:

a tick structure, a first resource and a second resource, and wherein the resource contributions are allocated to ticks in the tick structure;

receiving a user request specifying an exchange of a quantity of the first resource recorded in a user profile of a first user for the second resource;

matching the user request to one or more stored user requests in a user request database and determining a first returned resource quantity and an unsatisfied portion of the user request including a remaining resource quantity;

in response to the determination of the unsatisfied portion of the user request, matching the unsatisfied portion of the user request to the resource pool and determining a second returned resource quantity based on the remaining resource quantity and current quantities of the first and second resources in the resource pool, wherein determining the second returned resource quantity comprises:

determining a current tick in the tick structure;

determining a maximum provided quantity of the first resource based on real and virtual quantities of the first and second resources in the current tick;

determining the maximum provided quantity of the first resource exceeds a remaining submitted quantity of the first resource; and determining the second returned resource quantity based on the remaining submitted quantity of the first resource;

updating the user profile of the first user based on the first and second returned resource quantities; and in response to a request from the first user, withdrawing a portion of the first and second returned resource quantities from the automated intermediary system and updating the user profile of the first user.

11. The non-transitory computer-readable media of claim 10, wherein:

the first and second resources comprise at least one of cloud computing resources, communication network resources, or virtual machine types.

12. The non-transitory computer-readable media of claim 10, wherein:

the resource pool includes base units, complete units, or partially complete units.

13. The non-transitory computer-readable media of claim 10, wherein:

the second returned resource quantity is determined based on a base, partially complete, or complete exchange ratio for the resource pool.

14. The non-transitory computer-readable media of claim 10, wherein:

the second returned resource quantity is determined according to an invariant function.

15. The non-transitory computer-readable media of claim 14, wherein:

the invariant function comprises an additive or multiplicative invariant function.

16. The non-transitory computer-readable media of claim 14, wherein:

the invariant function is a time-dependent invariant function.

17. The non-transitory computer-readable media of claim 10, wherein:

the quantity of the first resource recorded in the user profile comprises a quantity of bundled resources obtained from a second user.

18. The non-transitory computer-readable media of claim 10, wherein:

determining the second returned resource quantity further comprises determining a diverted resource quantity.

* * * * *